US00RE41238E

(19) United States
(12) Reissued Patent
Saruta

(10) Patent Number: US RE41,238 E
(45) Date of Reissued Patent: Apr. 20, 2010

(54) PRINTER AND INK CARTRIDGE ATTACHED THERETO

(75) Inventor: Toshihisa Saruta, NaganoKen (JP)

(73) Assignee: Seiko Epson Corporation, Tokyo (JP)

(21) Appl. No.: 09/996,986

(22) Filed: Nov. 30, 2001

Related U.S. Patent Documents

Reissue of:
(64) Patent No.: 6,196,670
Issued: Mar. 6, 2001
Appl. No.: 09/449,731
Filed: Nov. 26, 1999

(30) Foreign Application Priority Data

| | | |
|---|---|---|
| Nov. 26, 1998 | (JP) | 10-336330 |
| Nov. 26, 1998 | (JP) | 10-336331 |
| Dec. 24, 1998 | (JP) | 10-367490 |
| Jan. 11, 1999 | (JP) | 11-003993 |
| Oct. 18, 1999 | (JP) | 11-296024 |

(51) Int. Cl.
*B41J 29/393* (2006.01)
*B41J 2/175* (2006.01)

(52) U.S. Cl. ..... 347/19; 347/86
(58) Field of Classification Search ..... 347/5, 347/7, 14, 19, 23, 29, 33–34, 86–87; 358/523, 358/524, 404, 444; 711/115; 395/112
See application file for complete search history.

(56) References Cited

U.S. PATENT DOCUMENTS 4,961,088 A 10/1990 Gilliland et al.
5,049,898 A 9/1991 Arthur et al.

(Continued)

FOREIGN PATENT DOCUMENTS

CN 1067981 A 1/1993

(Continued)

OTHER PUBLICATIONS

Japanese Office Action mailed Sep. 16, 2003, for Application Serial No. 2002–152154.

(Continued)

*Primary Examiner*—Anh T. N. Vo
(74) *Attorney, Agent, or Firm*—Stroock & Stroock & Lavan LLP

(57) ABSTRACT

A printer that enables required data, such as a remaining quantity of each ink, to be written securely even when a storage device having a relatively low allowable frequency of rewriting is applied for a storage element mounted on an ink cartridge. An ink cartridge that is detachably attached to the printer. In the printer, a sequential access-type EEPROM having a relatively low allowable frequency of rewriting is applied for storage elements incorporated in both a black ink cartridge and a color ink cartridge. A print controller in the printer has a memory, for which an EEPROM (or a DRAM) is applicable. Data relating to each ink cartridge, such as a remaining quantity of each ink in the ink cartridge, are stored into both the EEPROM of the print controller and a memory cell included in the storage element of the ink cartridge. The writing operation of data into the EEPROM of the print controller is carried out at every time the remaining quantity of each ink is calculated, whereas the writing operation into the memory cell in the storage element of the ink cartridge is carried out restrictedly in response to a power down instruction. This arrangement causes the frequency of writing into the storage element of the ink cartridge to be lower than the frequency of writing into the EEPROM of the print controller. This accordingly fulfills the requirements, that is, the sufficient reliability of data and the restriction of the allowable frequency of rewriting.

61 Claims, 16 Drawing Sheets

U.S. PATENT DOCUMENTS

| | | | | |
|---|---|---|---|---|
| 5,138,344 | A | | 8/1992 | Ujita |
| 5,365,312 | A | | 11/1994 | Hillmann et al. |
| 5,410,641 | A | | 4/1995 | Wakabayashi et al. ..... 395/112 |
| 5,491,540 | A | | 2/1996 | Hirst |
| 5,506,611 | A | | 4/1996 | Ujita et al. ..... 347/86 |
| 5,519,418 | A | | 5/1996 | Nishikawa et al. |
| 5,610,635 | A | | 3/1997 | Murray et al. ..... 347/7 |
| 5,646,660 | A | | 7/1997 | Murray |
| 5,699,091 | A | | 12/1997 | Bullock et al. |
| 5,786,828 | A | | 7/1998 | Yamamoto |
| 5,788,388 | A | | 8/1998 | Cowger et al. |
| 5,812,156 | A | | 9/1998 | Bullock et al. |
| 5,835,817 | A | | 11/1998 | Bullock et al. |
| 5,861,897 | A | | 1/1999 | Ide et al. |
| 5,930,553 | A | | 7/1999 | Hirst et al. |
| RE36,279 | E | | 8/1999 | Ujita |
| 5,975,677 | A | | 11/1999 | Marler et al. |
| 6,019,449 | A | | 2/2000 | Bullock et al. |
| 6,019,461 | A | | 2/2000 | Yoshimura et al. ..... 347/86 |
| 6,065,824 | A | | 5/2000 | Bullock et al. |
| 6,109,723 | A | | 8/2000 | Castle et al. |
| 6,126,265 | A | * | 10/2000 | Childers et al. ..... 347/23 |
| 6,168,262 | B1 | | 1/2001 | Clark et al. |
| 6,196,670 | B1 | | 3/2001 | Saruta |
| 6,312,073 | B1 | | 11/2001 | Inora et al. |
| 6,341,841 | B1 | | 1/2002 | Shimada et al. |
| 6,371,586 | B1 | | 4/2002 | Saruta |
| 6,447,090 | B1 | | 9/2002 | Saruta |
| 6,494,559 | B1 | | 12/2002 | Tsuji |
| 6,565,198 | B2 | | 5/2003 | Saruta et al. |
| 6,631,967 | B1 | | 10/2003 | Saruta |
| 2002/0085051 | A1 | | 7/2002 | Saruta |
| 2002/0180851 | A1 | | 12/2002 | Saruta |
| 2002/0191038 | A1 | | 12/2002 | Tsuji |
| 2002/0196302 | A1 | | 12/2002 | Saruta |
| 2003/0007027 | A1 | | 1/2003 | Saruta |
| 2003/0058297 | A1 | | 3/2003 | Saruta |
| 2003/0197751 | A1 | | 10/2003 | Saruta |

FOREIGN PATENT DOCUMENTS

| | | | |
|---|---|---|---|
| CN | 1189415 | A | 8/1998 |
| EP | 0443245 | | 8/1991 |
| EP | 789 322 | A2 | 8/1997 |
| EP | 0854043 | | 7/1998 |
| EP | 0854044 | | 7/1998 |
| EP | 0873873 | | 10/1998 |
| EP | 0891865 | | 1/1999 |
| EP | 0940259 | A2 | 9/1999 |
| EP | 1004449 | A2 | 5/2000 |
| EP | 1004451 | A2 | 5/2000 |
| EP | 1066967 | A2 | 1/2001 |
| EP | 1080911 | A2 | 3/2001 |
| EP | 1080912 | A2 | 3/2001 |
| EP | 1114726 | A1 | 7/2001 |
| EP | 1136268 | A1 | 9/2001 |
| EP | 1247651 | A2 | 10/2002 |
| GB | 2257274 | A | 1/1993 |
| GB | 2350220 | A | 11/2000 |
| JP | 59-79234 | A | 5/1984 |
| JP | 62-184856 | | 8/1987 |
| JP | 2-279344 | A | 11/1990 |
| JP | 4-500482 | | 1/1992 |
| JP | 05-020275 | | 1/1993 |
| JP | 05-193127 | | 8/1993 |
| JP | 06-103579 | A | 4/1994 |
| JP | 06-126981 | | 5/1994 |
| JP | 06-187438 | A | 7/1994 |
| JP | 06-261337 | A | 9/1994 |
| JP | 8-187854 | | 7/1996 |
| JP | 8-197748 | | 8/1996 |
| JP | 8-224885 | | 9/1996 |
| JP | 08-224886 | A | 9/1996 |
| JP | 08-224891 | A | 9/1996 |
| JP | 08-310007 | | 11/1996 |
| JP | 2594912 | | 12/1996 |
| JP | 9-1823 | | 1/1997 |
| JP | 9-309213 | A | 12/1997 |
| JP | 9-314861 | | 12/1997 |
| JP | 10-44475 | A | 2/1998 |
| JP | 10-044567 | A | 2/1998 |
| JP | 10-217509 | | 8/1998 |
| JP | 2000-301738 | | 10/2000 |
| WO | WO90/00974 | | 2/1990 |
| WO | WO96/05061 | | 2/1996 |
| WO | WO98/52762 | | 11/1998 |
| WO | WO99/65695 | | 12/1999 |
| WO | WO00/26034 | | 5/2000 |

OTHER PUBLICATIONS

Japanese Office Action mailed Sep. 16, 2003, for Application Serial No. 2002–179601.

Japanese Office Action mailed Oct. 28, 2003, for Application Serial No. 2002–152146.

Japanese Office Action mailed Oct. 28, 2003, for Application Serial No. 2002–171460.

"Serial EEPROM", Transistor Gijutsu SPECIAL No. 25, pp. 1–19, 86–88, and unnumbered page (with partial English translation).

U.S. Appl. No. 09/432,272, filed Nov. 2, 1999, Saruta.

U.S. Appl. No. 10/465,650, filed Jun. 20, 2003, Saruta.

Tietze, U., et al., "Halbleiter–Schaltungstechnik" (1993), cover, p. i, pp. 272–301, 624–41, 676–77, and 704–07.

Tietze, U., et al., "Electronic Circuits Design and Application", 10th ed. (1991), cover, pp. i, 242–69, 560–77, 606–09, and 630–35.

* cited by examiner

*Fig. 8*

80, 107K

| | Contents of Information | |
|---|---|---|
| 701 | 1st Data on remaining quantity of black ink | 760 |
| 702 | 2nd Data on remaining quantity of black ink | |
| 711 | Data on time (year) of unsealing ink cartridge | 750 |
| 712 | Data on time (month) of unsealing ink cartridge | |
| 713 | Version data of ink cartridge | |
| 714 | Data on type of ink | |
| 715 | Data on year of manufacture | |
| 716 | Data on month of manufacture | |
| 717 | Data on date of manufacture | |
| 718 | Data on production line | |
| 719 | Serial number data | |
| 720 | Data on recycle | |

*Fig. 9*

80, 107F

| | Contents of Information |
|---|---|
| 601 | 1st Data on remaining quantity of cyan ink |
| 602 | 2nd Data on remaining quantity of cyan ink |
| 603 | 1st Data on remaining quantity of magenta ink |
| 604 | 2nd Data on remaining quantity of magenta ink |
| 605 | 1st Data on remaining quantity of yellow ink |
| 606 | 2nd Data on remaining quantity of yellow ink |
| 607 | 1st Data on remaining quantity of light cyan ink |
| 608 | 2nd Data on remaining quantity of light cyan ink |
| 609 | 1st Data on remaining quantity of light magenta ink |
| 610 | 2nd Data on remaining quantity of light magenta ink |
| 611 | Data on time (year) of unsealing ink cartridge |
| 612 | Data on time (month) of unsealing ink cartridge |
| 613 | Version data of ink cartridge |
| 614 | Data on type of ink |
| 615 | Data on year of manufacture |
| 616 | Data on month of manufacture |
| 617 | Data on date of manufacture |
| 618 | Data on production line |
| 619 | Serial number data |
| 620 | Data on recycle |

660

650

Fig. 10

90, 100

| | Contents of Information |
|---|---|
| 801 | Data on remaining quantity of black ink |
| 802 | Data on time (year) of unsealing ink cartridge |
| 803 | Data on time (month) of unsealing ink cartridge |
| 804 | Version data of ink cartridge |
| 805 | Data on type of ink |
| 806 | Data on year of manufacture |
| 807 | Data on month of manufacture |
| 808 | Data on date of manufacture |
| 809 | Data on production line |
| 810 | Serial number data |
| 811 | Data on recycle |
| 821 | Data on remaining quantity of cyan ink |
| 822 | Data on remaining quantity of magenta ink |
| 823 | Data on remaining quantity of yellow ink |
| 824 | Data on remaining quantity of light cyan ink |
| 825 | Data on remaining quantity of light magenta ink |
| 826 | Data on time (year) of unsealing ink cartridge |
| 827 | Data on time (month) of unsealing ink cartridge |
| 828 | Version data of ink cartridge |
| 829 | Data on type of ink |
| 830 | Data on year of manufacture |
| 831 | Data on month of manufacture |
| 832 | Data on date of manufacture |
| 833 | Data on production line |
| 834 | Serial number data |
| 835 | Data on recycle |

PRINTER AND INK CARTRIDGE ATTACHED THERETO

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,196,670. The reissue applications are application Ser. Nos. 09/996,986 (the present application) and 11/056,608.*

BACKGROUND OF THE INVENTION

1. Field of the Invention

The present invention relates to a printing apparatus, such as an ink jet printer and an ink jet plotter, and also to an ink cartridge detachably attached to a printer main body of the printing apparatus. More specifically the invention pertains to a technique of processing and storing required pieces of information in the ink cartridge.

2. Description of the Related Art

A printing apparatus such as the ink jet printer and the ink jet plotter mainly includes an ink cartridge, in which one or plural inks are kept, and a printer main body with a print head to carry out actual printing operations on a printing medium. The print head ejects ink fed from the ink cartridge onto the printing medium, such as printing paper, so as to implement printing on the printing medium. The ink cartridge is designed to be detachably attached to the printer main body. A new ink cartridge has a predetermined quantity of ink kept therein. When the ink kept in an ink cartridge runs out, the ink cartridge is replaced with a new one. Such a printing apparatus is arranged to cause the printer main body to calculate the remaining quantity of ink in the ink cartridge based on the amount of ink ejected from the print head and to inform the user of a state of running out of the ink, in order to prevent the printing procedure from being interrupted by the out-of-ink.

Another proposed ink cartridge stores certain pieces of information, such as the type and the capacity of each ink kept in the ink cartridge, in advance. These pieces of information are stored, for example, in the form of a barcode, in the ink cartridge. The printer, to which such an ink cartridge is attached, scans the barcode and reads the certain pieces of information, such as the type of ink kept in the ink cartridge, thereby enabling a printing process suitable for the ink to be carried out.

While the certain pieces of information, such as the type of each ink kept in the ink cartridge, are stored in the ink cartridge, other pieces of information relating to the ink cartridge, such as a remaining quantity of each ink, are stored in the printer or a printer driver for the printer. In the event that the ink cartridge is replaced with a new one in the course of a printing process, the information relating to the ink cartridge, such as the remaining quantity of each ink, may be lost or made incorrect.

SUMMARY OF THE INVENTION

The object of the present invention is thus to provide a printer that adequately processes and stores information relating to a cartridge, such as a remaining quantity of each ink, as well as a cartridge, which is detachably attached to such a printer, without increasing the manufacturing cost of the ink cartridge.

At least part of the above and the other related objects is actualized by a printer, to which a cartridge is detachably attached, the cartridge keeping ink therein and having a rewritable non-volatile memory, wherein the ink kept in the cartridge is transferred from a print head mounted on a printer main body of the printer to a printing medium, so as to implement printing. The printer includes: a memory writing unit that writes plural pieces of information relating to the cartridge into the rewritable non-volatile memory of the cartridge at a preset timing and thereby at a certain frequency; a rewritable storage device incorporated in the printer main body of the printer; and an information writing unit that writes specific information into the rewritable storage device of the printer main body at a specified frequency that is higher than the certain frequency, at which the plural pieces of information relating to the cartridge are written into the non-volatile memory of the cartridge, the specific information being identical with at least part of the plural pieces of information relating to the cartridge.

The present invention is also directed to a method of managing information in a printer, which corresponds to the configuration of the printer discussed above. In the method, a cartridge, which is detachably attached to the printer, keeps ink therein and has a rewritable non-volatile memory, wherein the ink kept in the cartridge is transferred from a print head mounted on a printer main body of the printer to a printing medium, so as to implement printing. The method includes the steps of: writing plural pieces of information relating to the cartridge into the rewritable non-volatile memory of the cartridge at a preset timing and thereby at a certain frequency; and writing specific information into a rewritable storage device incorporated in the printer main body of the printer at a specified frequency that is higher than the certain frequency, at which the plural pieces of information relating to the cartridge are written into the non-volatile memory of the cartridge, the specific information being identical with at least part of the plural pieces of information relating to the cartridge.

In the printer and the corresponding method of the present invention, the rewritable non-volatile memory is mounted on the cartridge, which is detachably attached to the printer. Information relating to the cartridge is written into the storage device incorporated into the printer main body of the printer at a specified frequency, which is higher than a certain frequency, at which the information is written into the non-volatile memory of the cartridge. The information relating to the cartridge is thus updated at the higher frequency in the storage device of the printer, whereas the writing operation of the information into the non-volatile memory of the cartridge is restricted. This arrangement enables a storage element having a relatively low allowable frequency of rewriting to be applied for the non-volatile memory of the cartridge. This arrangement also prevents a possible trouble, that is, making the writing operation of information into the non-volatile memory incomplete, which occurs in a conventional structure when the power supply is suddenly cut off, for example, by power failure or by pulling the power plug out of the socket, in the course of the writing operation into the non-volatile memory of the cartridge.

The difference in frequency of writing may be attained by a specific configuration, wherein data are written into the non-volatile memory at the preset timing, whereas data are written into the storage device of the printer main body at the preset timing as well as at another timing.

In accordance with one preferable application of the present invention, the plural pieces of information are written into the rewritable non-volatile memory of the cartridge at a power-off time of the printer and/or at a time of replacement of the cartridge. While the power supply to the printer continues and the same cartridge is used, it is thought that the contents of the storage in the storage device of the printer main body accurately reflect the information relating to the cartridge attached to the printer.

In accordance with one preferable application of the present invention, the specific information is written into the rewritable storage device on completion of printing with regard to one page or on completion of printing with regard to at least one raster line. This is because the information relating to the cartridge is generally updated with the progress of the printing operation. By way of example, the amount of ink consumption gradually increases with the progress of the printing operation. It is accordingly effective to write the information regarding the amount of ink consumption into the storage device of the printer main body when the printing operation is completed with regard to one page or with regard to at least one raster line.

In accordance with another preferable application of the present invention, the printer further includes a cleaning unit that is activated in response to a predetermined operation, so as to carry out a head cleaning process, which causes the print head to eject a predetermined quantity of ink. In this structure, the specific information is written into the rewritable storage device at a timing when the cleaning unit is activated. This is because the head cleaning process consumes a relatively large quantity of ink. The timing of writing information into the storage device may be in the course of the head cleaning process, on completion of the head cleaning process, or before the head cleaning process is initiated.

In accordance with one preferable embodiment of the printer, the non-volatile memory transmits data by serial access. In this case, the plural pieces of information are written into the non-volatile memory of the cartridge in synchronism with a clock for specifying an address. The non-volatile memory that transmits data by serial access is generally inexpensive and desirably applied for the expendable cartridge.

In accordance with another preferable embodiment of the printer, the rewritable storage device of the printer main body is a non-volatile memory that holds contents of storage even after a power-off operation of the printer. In this case, the information in the storage device of the printer main body, which is rewritten at the high frequency, is kept even in the case of an accidental power off. In accordance with still another preferable embodiment of the printer, a writing rate of the rewritable storage device of the printer main body is higher than a writing rate of the rewritable non-volatile memory of the cartridge. Applying a high-speed storage element for the storage device of the printer main body that is rewritten at a high frequency enables the high-speed access in the printer main body and favorably reduces the total access time. Either a DRAM or an SRAM may be applicable as the high-speed storage element. The DRAM is generally inexpensive and readily available. The SRAM, on the other hand, does not require the refreshing process and is readily backed up.

The rewritable storage device of the printer main body may be disposed in a control IC, which directly controls the writing operation of the plural pieces of information into the non-volatile memory of the cartridge. In this structure, the printer main body is in charge of controlling the writing operation of data into the storage device of the printer main body incorporated in the control IC. In the case where there is a requirement for writing data into the non-volatile memory of the cartridge, for example, in the case of power failure, however, the control IC is in charge of controlling the writing operation into the non-volatile memory of the cartridge. This arrangement favorably relieves the loading to the printer main body, and enables the writing operation into the non-volatile memory of the cartridge to be carried out quickly. When there is a requirement for writing data, for example, in the case of cutting the power supply off, the printer main body outputs a writing instruction to the control IC. The control IC receives the writing instruction and directly writes the contents of storage in the storage device disposed therein into the non-volatile memory of the cartridge.

The printer may have a carriage, to which both a black ink cartridge, in which black ink is kept, and a color cartridge, in which a plurality of different color inks are kept, are detachably attached. In general, the printer may have a structure that receives any cartridge that keeps only one ink or a combination of selected inks. In this structure, a non-volatile memory should be provided in each cartridge, that is, respectively in the black cartridge and the color cartridge. The information relating to each cartridge is written into the non-volatile memory of the cartridge.

Although the writing operations into the non-volatile memory of the cartridge and into the rewritable storage device of the printer main body are carried out at different frequencies, the information is written into both the non-volatile memory and the rewritable storage device at some identical timings. For example, it is desirable that the data are written into both the storage device of the printer main body and into the non-volatile memory of the cartridge at a power-off time of the printer. In this case, the information may be written into the non-volatile memory of the cartridge, before the information is written into the storage device of the printer main body. This arrangement causes the contents of storage in the non-volatile memory of the cartridge to be securely updated. Even in the event that the cartridge is replaced with a new one during the power-off time of the printer, this enables the accurate pieces of information to be stored in the non-volatile memory of the cartridge.

In accordance with the alternative structure, the information is written into the non-volatile memory of the cartridge, after the writing operation of the information into the storage device of the printer main body is completed. In this case, a non-volatile storage element is applied for the rewritable storage device of the printer main body. This enables the storage device of the printer main body to securely hold the information relating to the cartridge. A storage element that enables the high-speed access is generally applied for the storage device of the printer main body. This advantageously completes the writing operation of the information relating to the cartridge within a short time period.

The printer and the corresponding method may further has a structure that determines whether or not the contents of storage in the non-volatile memory of the cartridge are coincident with the contents of storage in the rewritable storage device of the printer main body at a time of power supply to the printer and/or at a time of initiating a replacement of the cartridge. The structure reconciles the contents of storage in one of the non-volatile memory and the rewritable storage device with the contents of storage in the other of the non-volatile memory and the rewritable storage device, in the case where it is determined that the contents of storage in the non-volatile memory are not coincident with the contents of storage in the rewritable storage device. The contents of storage having the higher precision should be chosen preferentially over the other, based on a sequence of the writing operation discussed above. One possible application writes the information relating to the cartridge together with information regarding a writing time and refers to the information regarding the writing time to determine which contents of storage should be preferential over the other.

The present invention is further directed to a cartridge keeping ink therein and having a rewritable non-volatile memory, the cartridge being detachably attached to a printer, wherein information relating to the cartridge is written into the non-volatile memory of the cartridge at a certain frequency that is lower than a specified frequency, at which the information relating to the cartridge is written into a storage device incorporated in a printer main body of the printer.

The timings of the writing operations into the non-volatile memory of the cartridge and into the storage device of the printer main body are those discussed above with regard to the printer of the present invention. For example, the information relating to the cartridge may be written into the non-volatile memory of the cartridge at a power-off time of the printer and/or at a time of replacement of the cartridge.

The applicable type of the non-volatile memory, the sequence of the writing operations into the storage device of the printer main body and the non-volatile memory of the cartridge, and the configuration of carrying out the writing operation into the non-volatile memory of each cartridge are identical with those discussed above with regard to the printer of the present invention.

In accordance with one preferable application of the present invention, the cartridge has an ink reservoir that is parted into at least three ink chambers, in which at least three different inks are kept. In this case, the non-volatile memory of the ink cartridge has a plurality of information storage areas, in which plural pieces of information regarding quantities of the at least three different inks are stored respectively and independently. It is practical that a storage capacity of at least one byte is allocated to each of the plurality of information storage areas. The respective inks have different amounts of ink consumption. It is accordingly desirable to store the amount of ink consumption for each ink.

In accordance with another preferable application of the present invention, the cartridge has an ink reservoir that is parted into at least five ink chambers, in which at least five different inks are kept. The at least five different inks include three deep color inks and two light color inks, which correspond to two deep colors among the three deep color inks. In a concrete example, the three deep color inks are cyan, magenta, and yellow, and the two light color inks are light cyan and light magenta.

In accordance with one preferable embodiment of the cartridge, the non-volatile memory has a specific writing area, in which the plural pieces of information are written, on one end of a memory space thereof. The end area of the memory space readily generates an address to be accessed preferentially. Namely the end area of the memory space is often included in an area accessed first as default. In the non-volatile memory of sequential access type, the memory is sequentially accessed from a head position or an end position thereof. Assuring the writing area in one end of the memory space thus favorably enables the information relating to the cartridge, for example, the remaining quantity of ink in the cartridge, to be stored quickly and securely, while reducing the manufacturing cost of the cartridge.

A programmable ROM (EEPROM) that can be erased electrically may be applied for the non-volatile memory. A flash ROM is also applicable for the non-volatile memory.

In the configuration of the present invention, the information relating to the cartridge may include a piece of information regarding a remaining quantity of each ink in the ink cartridge or a piece of information regarding a cumulative amount of ink consumption with regard to the cartridge. The information may also include pieces of information regarding the type of ink kept in the ink cartridge and the term of validity of the cartridge. The information may further include pieces of information regarding the time elapsing after unsealing the cartridge and the frequency of attachment and detachment of the cartridge to and from the printer main body, both of which are measured by the printer main body. The information may further include the pieces of information regarding the year, month, and date of manufacture of the cartridge and the capacity of each ink in the cartridge. Part of these pieces of information are not changed by the use of the cartridge and may thereby be kept in a non-rewritable area.

These and other objects, features, aspects, and advantages of the present invention will become more apparent from the following detailed description of the preferred embodiments with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein

FIG. 8 shows a data array in the storage element 80 incorporated in the block ink cartridge 107K attached to the printer 1 shown in FIG. 1;

FIG. 9 shows a data array in the storage element 80 incorporated in the color ink cartridge 107F attached to the printer 1 shown in FIG. 1;

FIG. 10 shows a data array in an EEPROM 90 incorporated in the print controller 40 of the printer 1 shown in FIG. 1;

DESCRIPTION OF THE PREFERRED EMBODIMENT

First Embodiment

General Structure of Printing Apparatus

Figure 1:
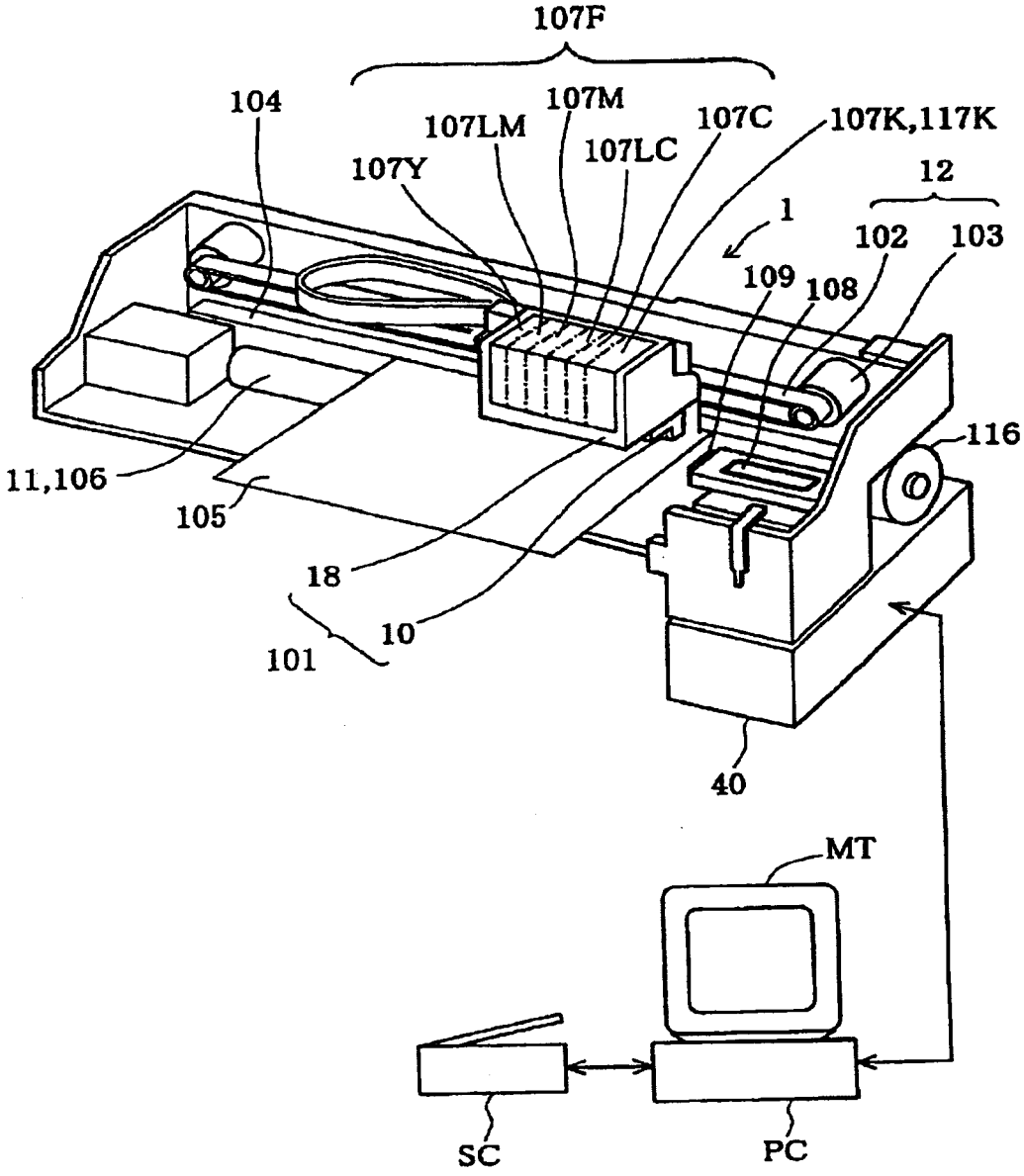
FIG. 1 is a perspective view illustrating the structure of a main part of a printer 1 in one embodiment according to the present invention.

FIG. 1 is a perspective view illustrating the structure of a main part of an ink jet printer 1 in one embodiment according to the present invention. The printer 1 of the embodiment is used in connection with a computer PC, to which a scanner SC is also connected. The computer PC reads and executes an operating system and predetermined programs to function, in combination with the printer 1, as a printing apparatus. The computer PC executes an application program on a specific operating system, carries out processing of an input image, for example, read from the scanner SC, and displays a processed image on a CRT display MT. When the user gives a printing instruction after the required image processing, for example, retouching the image on the CRT display MT, is concluded, a printer driver incorporated in the operating system is activated to transfer processed image data to the printer 1.

The printer driver converts original color image data, which are input from the scanner SC and subjected to the required image processing, to color image data printable by the printer 1 in response to the printing instruction, and outputs the converted color image data to the printer 1. The original color image data consists of three color components, that is, red (R), green (G), and blue (B). The converted color image data printable by and output to the printer 1 consists of six color components, that is, black (K), cyan (C), light cyan (LC), magenta (M), light magenta (LM), and yellow (Y). The printable color image data are further subjected to binary processing, which specifies the on-off state of ink dots. These image processing and data conversion processes are known in the art and are thus not specifically described here. These processes may be carried out in the printer 1, in place of the printer driver included in the computer PC, as discussed later.

The following describes the basic structure of the printer 1. Referring to FIG. 1 and the block diagram of FIG. 2, the printer 1 has a print controller 40 that is in charge of control procedures and a print engine 5 that actually performs ejection of ink. The print controller 40 and the print engine 5 are incorporated in a printer main body 100. The print engine 5 included in the printer main body 100 has a print head 10, a sheet feed mechanism 11, and a carriage mechanism 12. The print head 10 is integrally formed with a cartridge attachment unit 18 to construct a carriage 101. The print head 10, which is an ink jet type, is mounted on a specific face of the carriage 101 that faces a sheet of printing paper 105, that is, a lower face of the carriage 101 in this embodiment. The carriage mechanism 12 includes a carriage motor 103 and a timing belt 102. The carriage motor 103 drives the carriage 101 via the timing belt 102. The carriage 101 is guided by a guide member 104 and moves forward and backward along a width of the printing paper 105 by means of normal and reverse rotations of the carriage motor 103. The sheet feed mechanism 11 that feeds the printing paper 105 includes a sheet feed roller 106 and a sheet feed motor 116.

A black ink cartridge 107K and a color ink cartridge 107F, which will be described later, are detachably attached to the cartridge attachment unit 18 of the carriage 101. The print head 10 receives supplies of inks fed from these ink cartridges 107K and 107F and ejects ink droplets against the printing paper 105 with a movement of the carriage 101, so as to create dots and print a picture image or letters on the printing paper 105.

Each of the ink cartridges 107K and 107F has a cavity therein for keeping ink, which is prepared by dissolving or dispersing a dye or a pigment in a solvent. The cavity for keeping ink therein is generally referred to as an ink chamber. The black ink cartridge 107K has an ink chamber 117K, in which black ink (K) is kept. The color ink cartridge 107F has a plurality of ink chambers 107C, 107LC, 107M, 107LM, and 107Y, which are formed separately. Cyan ink (C), light cyan ink (LC), magenta ink (M), light magenta ink (LM), and yellow ink (Y) are kept respectively in these ink chambers 107C, 107LC, 107M, 107LM, and 107Y. The print head 10 receives supplies of various color inks fed from the respective ink chambers 107C, 107LC, 107M, 107LM, and 107Y, and ejects ink droplets of various colors to implement color printing.

A capping unit 108 and a wiping unit 109 are disposed on one end of the printer 1, which is included in a non-printable area. The capping unit 108 closes nozzle opening formed on the print head 10 during the stoppage of printing operation. The capping unit 108 effectively prevents the solvent component in the ink from being vaporized during the stoppage of a printing operation. Preventing the vaporization of the solvent component in the ink favorably depresses an increase in viscosity of ink and formation of an ink film. Capping the nozzle openings during the stoppage of a printing operation effectively prevents the nozzles from being clogged. The capping unit 108 also has a function of collecting ink droplets ejected from the print head 10 by a flushing operation. The flushing process is carried out to eject ink when the carriage 101 reaches the end of the printer 1 during the execution of the printing operation. The flushing process is one of the actions for preventing the nozzles from being clogged. The wiping unit 109 is located in the vicinity of the capping unit 108 to wipe the surface of the print head 10, for example, with a blade, so as to wipe out the ink residue or paper dust adhering to the surface of the print head 10. In addition to these actions, the printer 1 of the embodiment carries out a sucking operation with regard to the nozzles, for example, in the case of an abnormality occurring due to invasion of bubbles into the nozzles. The sucking process presses the capping unit 108 against the print head 10 to seal the nozzle openings, activates a suction pump (not shown), and makes a passage connecting with the capping unit 108 in a negative pressure, so as to cause ink to be sucked out of the nozzles on the print head 10. The flushing operation, the wiping operation, and the sucking operation are included in a head cleaning procedure. The wiping operation may be carried out by an automatic mechanism that uses a preset blade and automatically wipes the surface of the print head 10 with forward and backward movements of the carriage 101. In this case, only the flushing operation and the sucking operation are included in the active head cleaning procedure.

Figure 2:
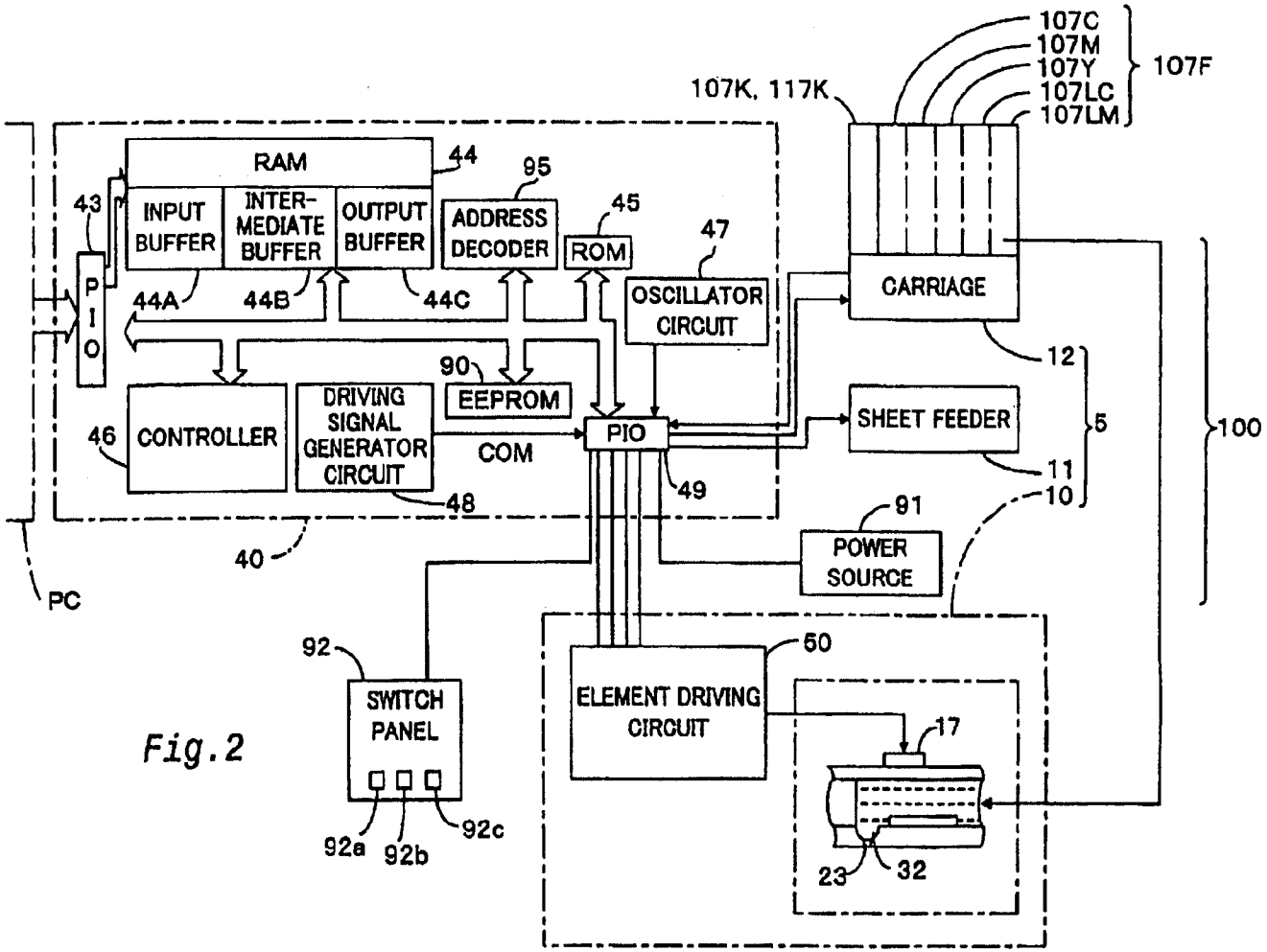
FIG. 2 is a block diagram illustrating the internal structure of the printer 1 including a print controller 40.

A control circuit of the printer 1 is discussed with FIG. 2, which is a functional block diagram showing the internal structure of the ink jet printer 1 of the embodiment. The print controller 40 has an interface 43 that receives various data, such as print data, transmitted from the computer PC, a RAM 44 in which the various data including print data are stored, and a ROM 45 in which programs for various data processing are stored. The print controller 40 further has a controller 46 including a CPU, an oscillator circuit 47, a driving signal generator circuit 48 that generates a driving signal COM given to the print head 10, and a parallel input-output interface 49 that transmits the print data developed to dot pattern data and the driving signal COM to the print engine 5.

Control lines of a switch panel 92 and a power source 91 are also connected to the print controller 40 via the parallel input-output interface 49. The switch panel 92 has a power switch 92a for turning the power source 91 on and off, a cartridge switch 92b for giving an instruction to replace the ink cartridge with a new one, and a cleaning switch 92c for giving an instruction to perform the forcible cleaning of the print head 10. When the power switch 92a on the switch panel 92 is operated to input an instruction of a power-off operation, the print controller 40 outputs a power down instruction as a requirement of non-maskable interruption NMI to the power source 91. The power source 91 receives the power down instruction NMI and falls into a stand-by state. In the stand-by state, the power source 91 supplies a stand-by electric power to the print controller 40 via a power supply line (not shown). The standard power-off operation carried out via the switch panel 92 thus does not completely cut off the power supply to the print controller 40.

The print controller 40 monitors whether or not a preset electric power is supplied from the power source 91, and outputs the power down instruction NMI when a power plug is pulled out of a socket. The power source 91 has an auxiliary power unit, for example, a capacitor, to ensure a power supply for a predetermined time period, for example, 0.3 seconds, after the power plug is pulled out of the socket. The print controller 40 also outputs the power down instruction NMI when the cartridge switch 92b on the switch panel 92 is operated to give an instruction of replacing the ink cartridge.

The print controller 40 has an EEPROM 90 mounted thereon as a memory of the printer main body 100, which stores information relating to the black ink cartridge 107K and the color ink cartridge 107F mounted on the carriage mechanism 12 as shown in FIG. 1. The EEPROM 90 stores plural pieces of specific information including information relating to quantities of inks in the black ink cartridge 107K and the color ink cartridge 107F, as discussed later in detail. The ink quantity-relating information may regard the remaining quantities of inks in the ink cartridges 107K and 107F or the amounts of ink consumption with regard to the ink cartridges 107K and 107F. The print controller 40 also has an address decoder 95, which converts desired addresses in a memory cell 81 (described later) of a storage element 80 (described later), at which the controller 46 requires to gain accesses (read and write), into numbers of clocks. The controller 46 in the print controller 40 generally processes data by the unit of 8 bits or 1 byte. The memory cell 81 of the storage element 80 incorporated in the ink cartridges 107K and 107F is serially accessed in synchronism with reading and writing clocks. The address decoder 95 accordingly converts the addresses to be accessed into the numbers of clocks.

The printer 1 determines the amount of ink consumption by calculation. The calculation of the amount of ink consumption may be carried out by the printer driver incorporated in the computer PC or by the printer 1. The calculation of the amount of ink consumption is performed by taking into account the following two factors.

(1) Amount of ink consumption by printing an image.

In order to accurately calculate the amount of ink consumption in the process of printing, image data are subjected to color conversion and binarization processes and converted to on-off data of ink dots. With regard to the image data in the on condition of ink dots, the weight of each dot is multiplied with the number of dots. Namely the frequency of ejection of ink droplets from the nozzle openings 23 is multiplied by the weight of each ink droplet. The amount of ink consumption may be approximated from the densities of the respective pixels included in the image data.

(2) Amount of ink consumption by cleaning the print head 10.

The amount of ink consumption by cleaning the print head 10 includes an amount of ink ejection by the flushing operation and an amount of ink suction by the sucking operation. The action of the flushing operation is identical with the normal ejection of the ink droplets, and the amount of ink ejection by the flushing operation is thus calculated in the same manner as described in the factor (1). The amount of ink consumption by the sucking operation is stored in advance according to the revolving speed and the activation time of the sucking pump. The amount of ink consumed by one sucking action is generally measured and stored in advance.

The current remaining quantity of ink is determined by subtracting the calculated amount of ink consumption from the previous remaining quantity of ink prior to the current printing operation. The controller 46 carries out the calculation of the remaining quantity of ink according to a specific program, for example, one stored in the ROM 45, using data stored in the EEPROM 90.

In the arrangement of this embodiment, the color conversion and binarization processes are performed by the printer driver in the computer PC as described previously. The printer 1 thus receives the binary data, that is, the data on the dot on-off conditions with regard to each ink. The printer 1 multiplies the weight of ink for each dot (that is, the weight of each ink droplet) by the number of dots to determine the amount of ink consumption, based on the input binary data.

The ink jet printer 1 of the embodiment receives the binary data as described previously. The array of the binary data is, however, not coincident with the nozzle array on the print head 10. The control unit 46 accordingly divides the RAM 44 into three portions, that is, an input buffer 44A, an intermediate buffer 44B, and an output buffer 44C, in order to perform the rearrangement of the dot data array. The ink jet printer 1 may alternatively carry out the required processing for the color conversion and the binarization. In this case, the ink jet printer 1 registers the print data, which include the multi-tone information and are transmitted from the computer PC, into the input buffer 44A via the interface 43. The print data kept in the input buffer 44A are subjected to command analysis and then transmitted to the intermediate buffer 44B. The controller 46 converts the input print data into intermediate codes by supplying information regarding the printing positions of the respective letters or characters, the type of modification, the size of the letters or characters, and the font address. The intermediate codes are kept in the intermediate buffer 44B. The controller 46 then analyzes the intermediate codes kept in the intermediate buffer 44B and decodes the intermediate codes into binary dot pattern data. The binary dot pattern data are expanded and stored in the output buffer 44C.

In any case, when dot pattern data corresponding to one scan of the print head 10 are obtained, the dot pattern data are serially transferred from the output buffer 44C to the print head 10 via the parallel input-output interface 49. After the dot pattern data corresponding to one scan of the print head 10 are output from the output buffer 44C, the process erases the contents of the intermediate buffer 44B to wait for conversion of a next set of print data.

The print head 10 causes the respective nozzle openings 23 to eject ink droplets against the printing medium at a predetermined timing, so as to create an image corresponding to the input dot pattern data on the printing medium. The driving signal COM generated in the driving signal generator circuit 48 is output to an element driving circuit 50 in the print head 10 via the parallel input-output interface 49. The print head 10 has a plurality of pressure chambers 32 and a plurality of piezoelectric vibrators 17 (pressure-generating elements) respectively connecting with the nozzle openings 23. The number of both the pressure chambers 32 and the piezoelectric vibrators 17 is thus coincident with the number of the nozzle openings 23. When the driving signal COM is sent from the element driving circuit 50 to a certain piezoelectric vibrator 17, the corresponding pressure chamber 32 is contracted to cause the corresponding nozzle opening 23 to eject an ink droplet.

Figure 3:
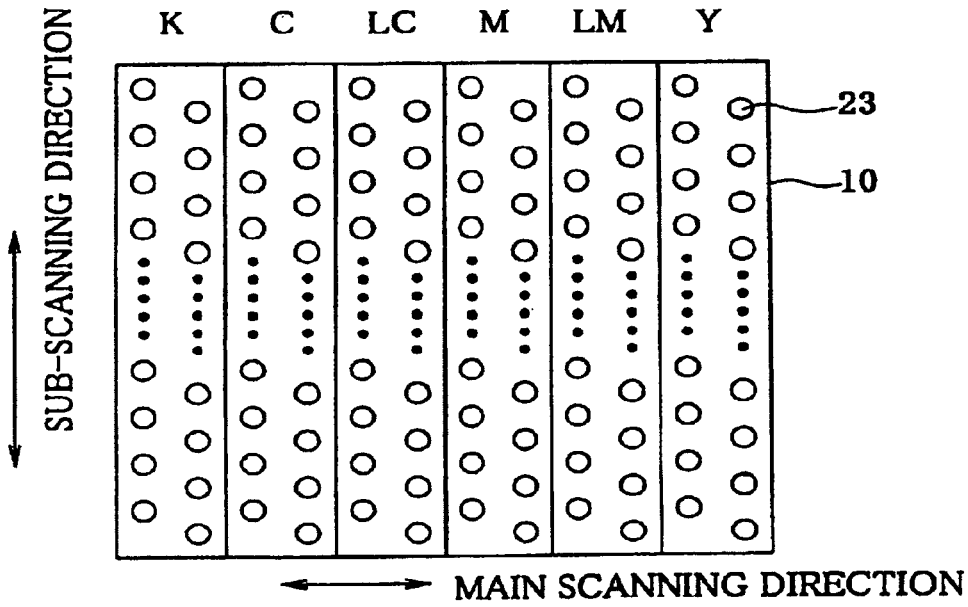
FIG. 3 shows a layout of nozzle openings 23 formed on the print head 10 shown in FIG. 1.

FIG. 3 shows an exemplified layout of the nozzle openings 23 on the print head 10. The print head 10 has a plurality of nozzle arrays respectively corresponding to the black ink (K), the cyan ink (C), the light cyan ink (LC), the magenta ink (M), the light magenta ink (LM), and the yellow ink (Y). Each nozzle array includes the nozzle openings 23 which are arranged in two lines and zigzag. (Structure of Ink Cartridges 107K, 107F and Cartridge Attachment Unit 18)

The black ink cartridge 107K and the color ink cartridge 107F, which are attached to the ink jet printer 1 having the above configuration, have a common basic structure. The following description regards the structure of the ink cartridge, the black ink cartridge 107K as an example, and the structure of the cartridge attachment unit 18 of the printer main body 100, which receives and holds the ink cartridge 107K, with reference to FIGS. 4A, 4B, and 5.

Figure 4A:
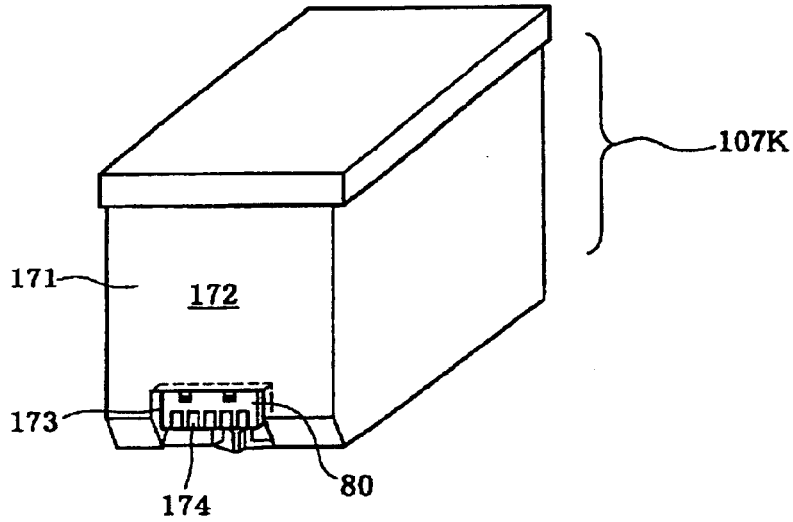
FIGS. 4A and 4B are perspective views respectively illustrating the structures of an ink cartridge 107K and a cartridge attachment unit 18.
Figure 4B:
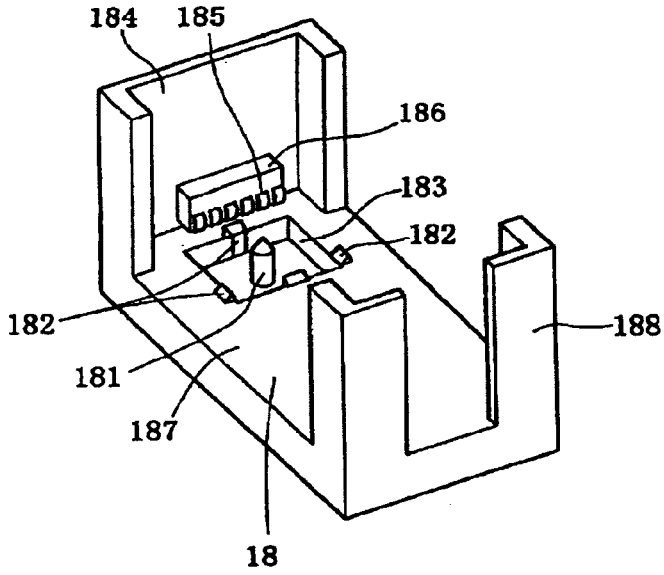
Figure 5:
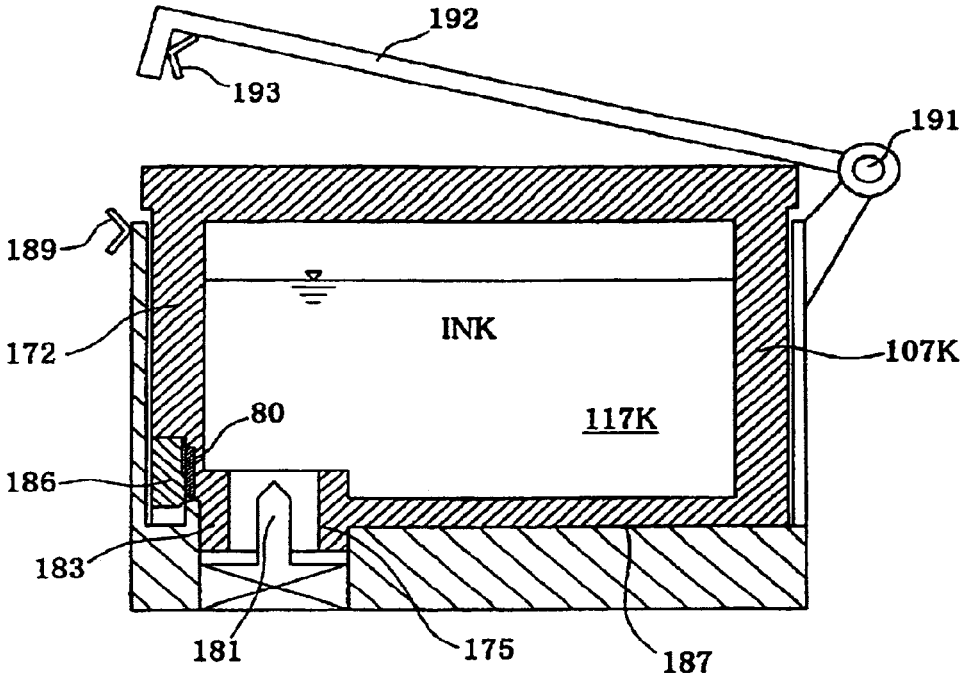
FIG. 5 is a sectional view illustrating an attachment state in which the ink cartridge 107K shown in FIG. 4A is attached to the cartridge attachment unit 18 shown in FIG. 4B.

FIGS. 4A and 4B are perspective views schematically illustrating the structures of the Ink cartridge 107K and the cartridge attachment unit 18 of the printer main body 100. FIG. 5 is a sectional view Illustrating an attachment state in which the ink cartridge 107K is attached to the cartridge attachment unit 18.

Referring to FIG. 4A, the ink cartridge 107K has a cartridge main body 171 that is composed of a synthetic resin and defines the ink chamber 117K In which black ink is kept, and a storage element (non-volatile memory) 80 incorporated in a side frame 172 of the cartridge main body 171. An EEPROM is generally applied for the storage element 80 that is rewritable by electrically erasing the non-required contents of storage and maintains the contents of storage even after the power supply is cut off. The allowable frequency of rewriting data in the storage element 80 is about ten thousand times, which is significantly lower than the allowable frequency of rewriting in the EEPROM 90 incorporated in the print controller 40. This makes the cost of the storage element 80 extremely low. The storage element 80 enables transmission of various data to and from the printer controller 40 of the printer 1, while the ink cartridge 107K is attached to the cartridge attachment unit 18 of the printer main body 100 shown in FIG. 4B. The storage element 80 is received in a bottom-opened recess 173 formed in the side frame 172 of the ink cartridge 107K. The storage element 80 has a plurality of connection terminals 174 exposed to the outside in this embodiment. The whole storage element 80 may, however, be exposed to the outside. Alternatively the whole storage element 80 is embedded, and separate connection terminals may be provided independently.

Referring to FIG. 4B, the cartridge attachment unit 18 has an ink supply needle 181, which is disposed upward on a bottom 187 of a cavity, in which the ink cartridge 107K is accommodated. A recess 183 is formed about the needle 181. When the ink cartridge 107K is attached to the cartridge attachment unit 18, an ink supply unit 175 (see FIG. 5), which is projected from the bottom of the ink cartridge 107K, is fitted in the recess 183. Three cartridge guides 182 are set on the inner wall of the recess 183. A connector 186 is placed on an inner wall 184 of the cartridge attachment unit 18. The connector 186 has a plurality of electrodes 185, which are in contact with and thereby electrically connect with the plurality of connection terminals 174 of the storage element 80 when the ink cartridge 107K is attached to the cartridge attachment unit 18.

The ink cartridge 107K is attached to the cartridge attachment unit 18 according to the following procedure. When the user operates the cartridge switch 92b on the switch panel 92 to give an instruction of replacing the ink cartridge 107K, the carriage 101 moves to a certain position that allows replacement of the ink cartridge 107K. The procedure of replacement first removes the used ink cartridge 107K. A lever 192 is fixed to a rear wall 188 of the cartridge attachment unit 18 via a support shaft 191 as shown in FIG. 5. The user pulls up the lever 192 to a release position, at which the ink cartridge 107K can be removed from the cartridge attachment unit 18. A new ink cartridge 107K is then located on the cartridge attachment unit 18, and the lever 192 is pressed down to a fixation position, which is over the ink cartridge 107K. The press-down motion of the lever 192 presses the ink cartridge 107K downward, so as to make the ink supply unit 175 fitted into the recess 183 and make the needle 181 pierce the ink supply unit 175, thereby enabling a supply of ink. As the lever 192 is further pressed down, a clutch 193 disposed on a free end of the lever 192 engages with a mating element 189 disposed on the cartridge attachment unit 18. This securely fixes the ink cartridge 107K to the cartridge attachment unit 18. In this state, the plurality of connection terminals 174 on the storage element 80 in the ink cartridge 107K electrically connect with the plurality of electrodes 185 on the cartridge attachment unit 18. This enables transmission of data between the printer main body 100 and the storage element 80. When the replacement of the ink cartridge 107K is completed and the user operates the switch panel 92 again, the carriage 101 returns to the initial position to be in the printable state.

The color ink cartridge 107F basically has a similar structure to that of the ink cartridge 107K, and only the difference is described here. The color ink cartridge 107F has five ink chambers in which five different color inks are kept. It is required to feed the supplies of the respective color inks to the print head 10 via separate pathways. The color ink cartridge 107F accordingly has five ink supply units 175, which respectively correspond to the five different color inks. The color ink cartridge 107F, in which five different color inks are kept, however, has only one storage element 80 incorporated therein. Pieces of information regarding the ink cartridge 107F and the five different color inks are collectively stored in this storage element 80.

Structure of Storage Element 80

Figure 6:
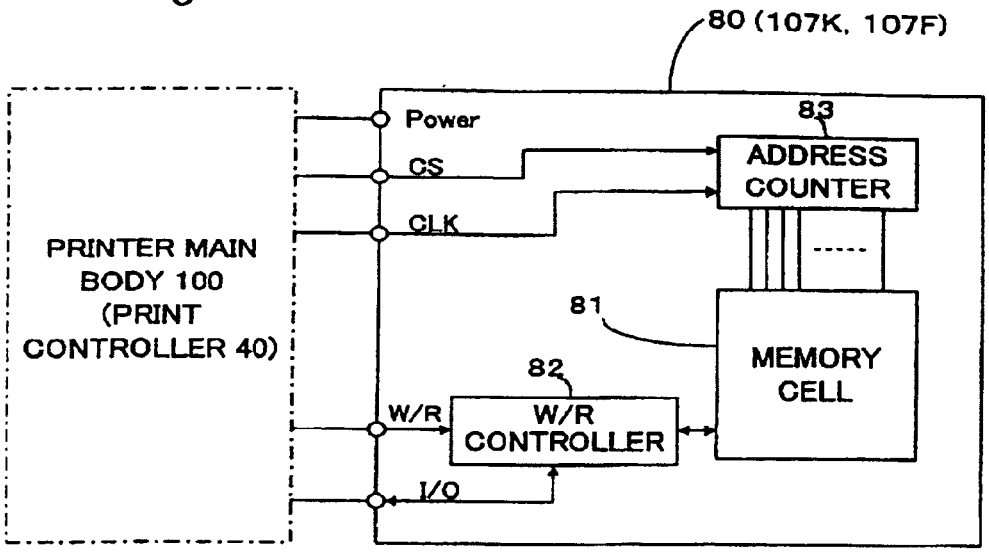
FIG. 6 is a block diagram showing the configuration of a storage element 80 incorporated in the ink cartridges 107K and 107F attached to the printer 1 shown in FIG. 1.
Figure 7A:
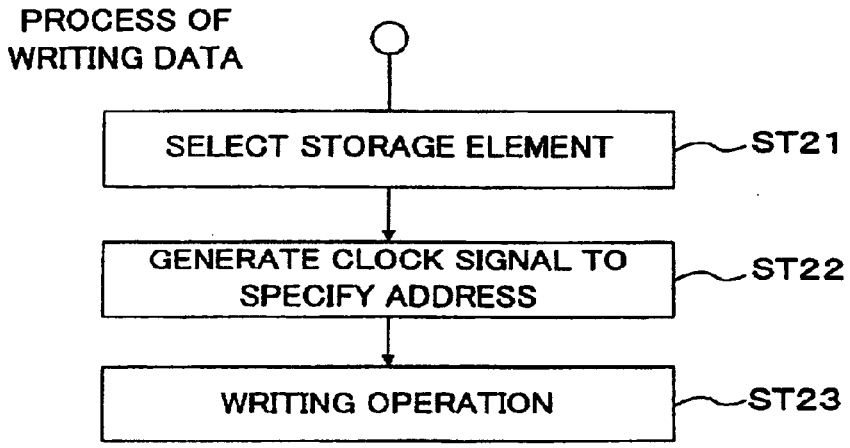
FIG. 7A is a flowchart showing a processing routine to write data into the storage element 80.
Figure 7B:
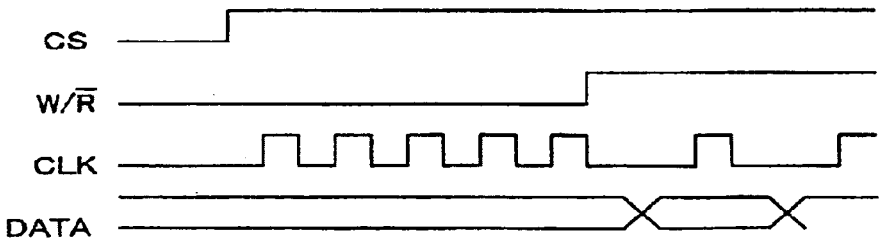
FIG. 7B is a timing chart showing the timing of execution of the processing shown in the flowchart of FIG. 7A.

FIG. 6 is a block diagram showing the configuration of the storage element 80 incorporated in the ink cartridges 107K FIGS. 7A and 7B show a data writing process into the memory cell 81.

As shown in the block diagram of FIG. 6, the storage element 80 of the ink cartridges 107K and 107F includes the memory cell 81, a read/write controller 82, and an address counter 83. The read/write controller 82 is a circuit that controls reading and writing operations of data from and into the memory cell 81. The address counter 83 counts up in response to a clock signal CLK and generates an output that represents an address with regard to the memory cell 81.

The actual procedure of the writing operation is described with reference to FIGS. 7A and 7B. FIG. 7A is a flowchart showing a processing routine executed by the print controller 40 in the printer 1 of the embodiment to write the remaining quantities of inks into the storage elements 80 incorporated in the black and color ink cartridges 107K and 107F, and FIG. 7B is a timing chart showing the timing of execution of the processing shown in the flowchart of FIG. 7A.

The controller 46 of the printer controller 40 first makes a chip select signal CS, which sets the storage element 80 in an enabling state, in a high level at step ST21. While the chip select signal CS is kept at the low level, the count on the address counter 83 is set equal to zero. When the chip select signal CS is set to the high level, the address counter 83 is enabled to start the count. The controller 46 then generates a required number of pulses of the clock signal CLK to specify an address, at which data are written, at step ST22. The address decoder 95 incorporated in the print controller 40 is used to determine the required number of pulses of the clock signal CLK. The address counter 83 included in the storage element 80 counts up in response to the required number of pulses of the clock signal CLK thus generated. During this process, a read/write signal R/W is kept in a low level. This means that an instruction of reading data is given to the memory cell 81. Dummy data are accordingly read synchronously with the output clock signal CLK.

After the address counter 83 counts up to the specified address for writing data, the controller 46 carries out an actual writing operation at step ST23. The writing operation switches the read/write signal R/W to the high level, outputs one-bit data to a data terminal I/O, and changes the clock signal CLK to a high active state on the completion of data output. While the read/write signal R/W is in the high level, data DATA of the data terminal I/O are written into the memory cell 81 of the storage element 80 synchronously with a rise of the clock signal CLK. Although the writing operation starts synchronously with a fifth pulse of the clock signal CLK in the example of FIG. 7B, this only describes the general writing procedure. The writing operation of required data, for example, the remaining quantity of ink, may be carried out at any pulse, for example, at a first pulse, of the clock signal CLK according to the requirements.

Data arrays of the storage elements 80, in which data are written, are described with reference to FIGS. 8 and 9. FIG. 8 shows a data array in the storage element 80 incorporated in the black ink cartridge 107K attached to the printer 1 of this embodiment shown in FIG. 1. FIG. 9 shows a data array in the storage element 80 incorporated in the color ink cartridge 107F attached to the printer 1. FIG. 10 shows a data array in the EEPROM 90 incorporated in the print controller 40 of the printer main body 100.

Referring to FIG. 8, the memory cell 81 of the storage element 80 incorporated in the black ink cartridge 107K has a first storage area 750, in which read only data are stored, and a second storage area 760, in which rewritable data are stored. The printer main body 100 can only read the data stored in the first storage area 750, while enabling both reading and writing operations with regard to the data stored in the second storage area 760. The second storage area 760 is located at an address, which is accessed prior to the first storage area 750. Namely the second storage area 760 has a lower address than that of the first storage area 750. In the specification hereof, the expression 'lower address' means an address closer to the head of the memory space.

The rewritable data stored in the second storage area 760 include first data on the remaining quantity of black ink and second data on the remaining quantity of black ink that are respectively allocated to first and second black ink remaining quantity memory divisions 701 and 702, which are accessed in this order.

There are the two black ink remaining quantity memory divisions 701 and 702 for storing the data on the remaining quantity of black ink. This arrangement enables the data on the remaining quantity of black ink to be written alternately in these two memory divisions 701 and 702. If the latest data on the remaining quantity of black ink is stored in the first black ink remaining quantity memory division 701, the data on the remaining quantity of black ink stored in the second black ink remaining quantity memory division 702 is the previous data immediately before the latest data, and the next writing operation is performed in the second black ink remaining quantity memory division 702.

The read only data stored in the first storage area 750 include data on the time (year) of unsealing the ink cartridge 107K, data on the time (month) of unsealing the ink cartridge 107K, version data of the ink cartridge 107K, data on the type of ink, for example, a pigment or a dye, data on the year of manufacture of the ink cartridge 107K, data on the month of manufacture of the ink cartridge 107K, data on the date of manufacture of the ink cartridge 107K, data on the production line of the ink cartridge 107K, serial number data of the ink cartridge 107K, and data on recycling showing whether the ink cartridge 107K is new or recycled, which are respectively allocated to memory divisions 711 through 720 that are accessed in this order.

Referring to FIG. 9, the memory cell 81 of the storage element 80 incorporated in the color ink cartridge 107F has a first storage area 650, in which read only data are stored, and a second storage area 660, in which rewritable data are stored. The printer main body 100 can only read the data stored in the first storage area 650, while enabling both reading and writing operations with regard to the data stored in the second storage area 660. The second storage area 660 is located at an address, which is accessed prior to the first storage area 650. Namely the second storage area 660 has a lower address (that is, an address closer to the head) than that of the first storage area 650.

The rewritable data stored in the second storage area 660 include first data on the remaining quantity of cyan ink, second data on the remaining quantity of cyan ink, first data on the remaining quantity of magenta ink, second data on the remaining quantity of magenta ink, first data on the remaining quantity of yellow ink, second data on the remaining quantity of yellow ink, first data on the remaining quantity of light cyan ink, second data on the remaining quantity of light cyan ink, first data on the remaining quantity of light magenta ink, and second data on the remaining quantity of light magenta ink that are respectively allocated to color ink remaining quantity memory divisions 601 through 610, which are accessed in this order.

In the same manner as the black ink cartridge 107K, there are the two memory divisions, that is, the first color ink remaining quantity memory division 601 (603, 605, 607, 609) and the second color ink remaining quantity memory division 602 (604, 606, 608, 610), for storing the data on the remaining quantity of each color ink. This arrangement enables the data on the remaining quantity of each color ink to be rewritten alternately in these two memory divisions.

Like the black ink cartridge 107K, the read only data stored in the first storage area 650 include data on the time (year) of unsealing the ink cartridge 107F, data on the time (month) of unsealing the ink cartridge 107F, version data of the ink cartridge 107F, data on the type of ink, data on the year of manufacture of the ink cartridge 107F, data on the month of manufacture of the ink cartridge 107F, data on the date of manufacture of the ink cartridge 107F, data on the production line, serial number data, and data on recycling that are respectively allocated to memory divisions 611 through 620, which are accessed in this order. These data are common to all the color inks, so that only one set of data are provided and stored as common data to all the color inks.

When the power source 91 of the printer 1 is turned on after the ink cartridges 107K and 107F are attached to the printer main body 100, these data are read by the printer main body 100 and stored into the EEPROM 90 incorporated in the printer main body 100. As shown in FIG. 10, memory divisions 801 through 835 in the EEPROM 90 store all the data stored in the respective storage elements 80 including the remaining quantities of the respective inks in the black ink cartridge 107K and the color ink cartridge 107F.

Operation of Printer 1

Figure 11:
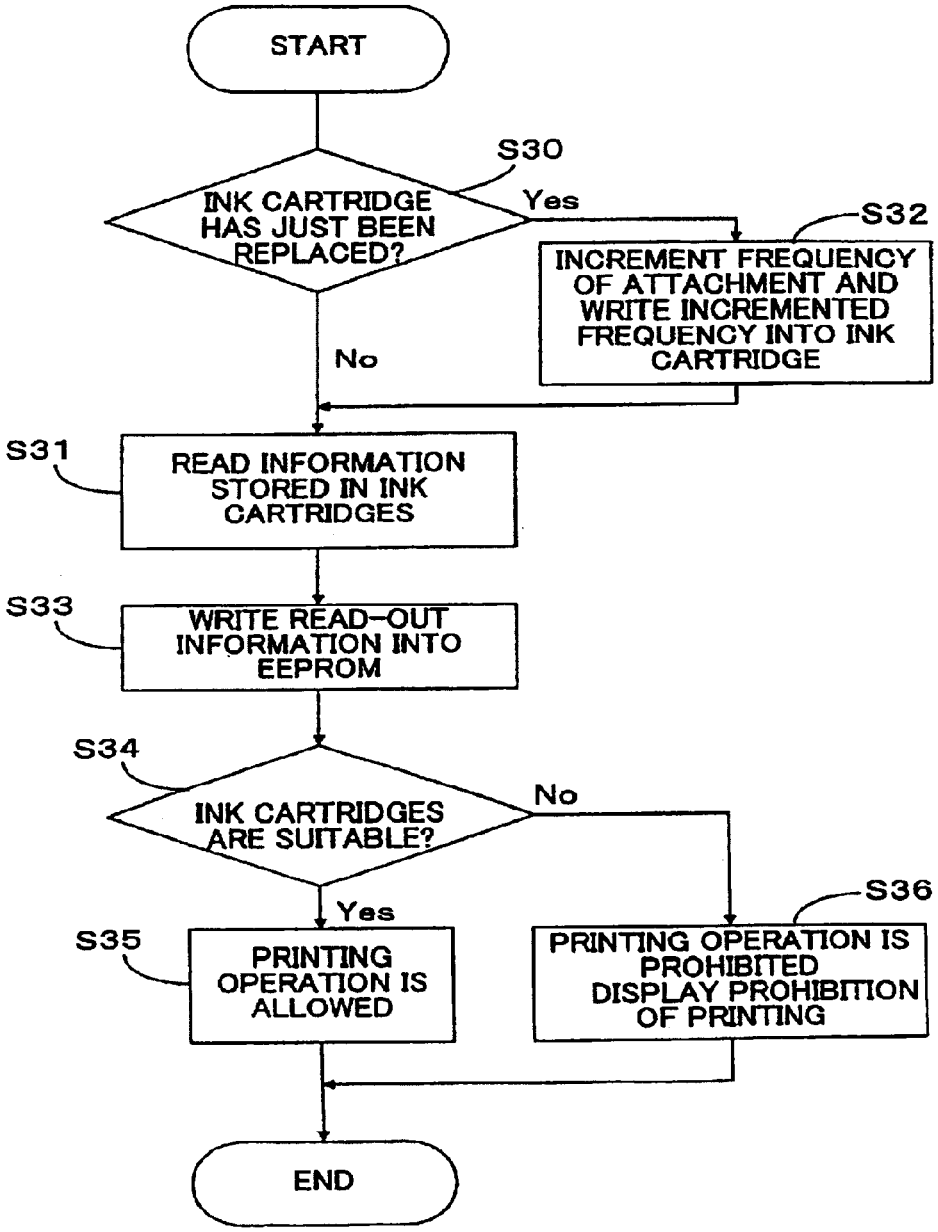
FIG. 11 is a flowchart showing a processing routine executed at a time of power supply to the printer 1.
Figure 12:
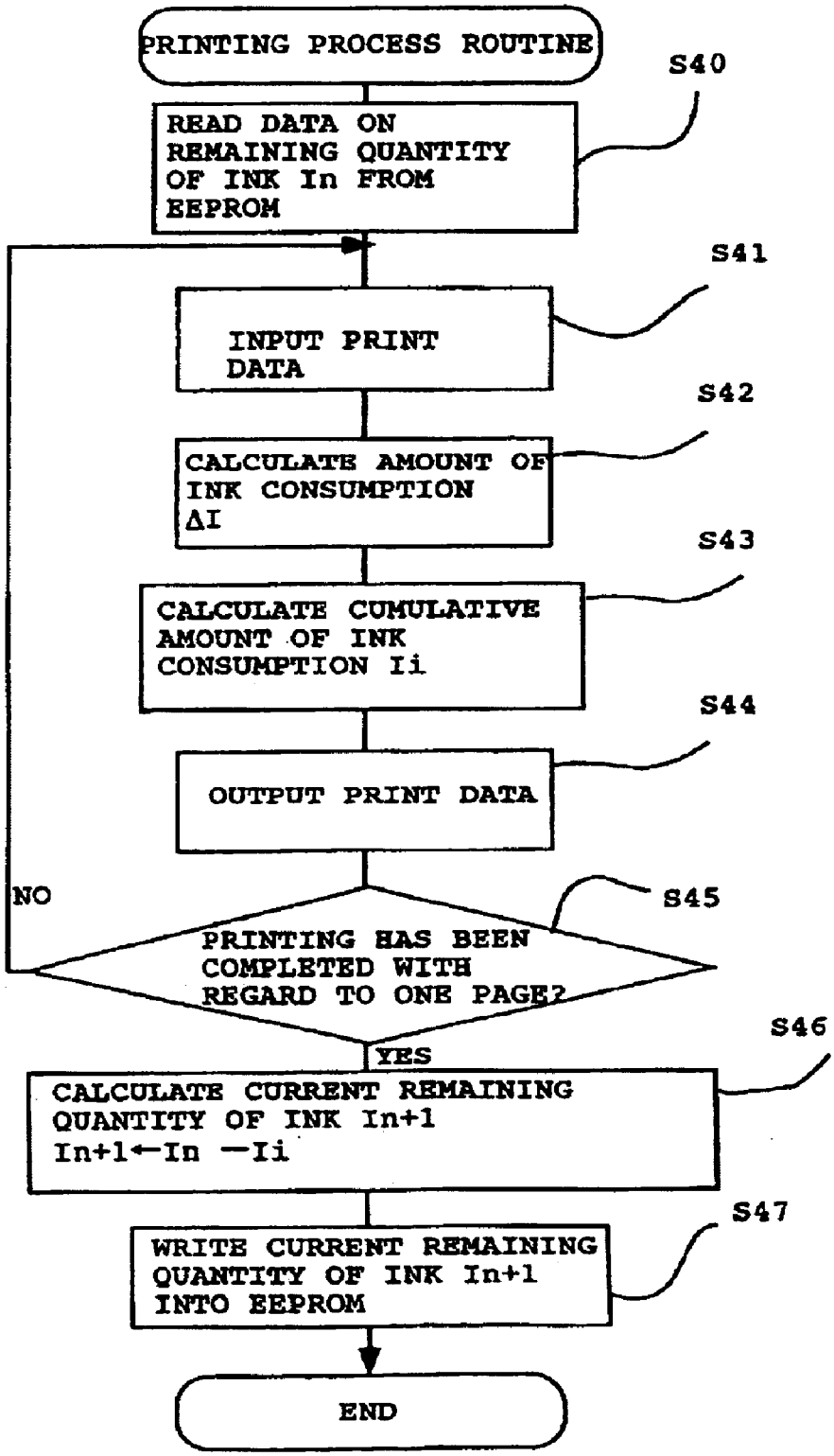
FIG. 12 is a flowchart showing a processing routine to calculate the remaining quantity of ink.
Figure 13:
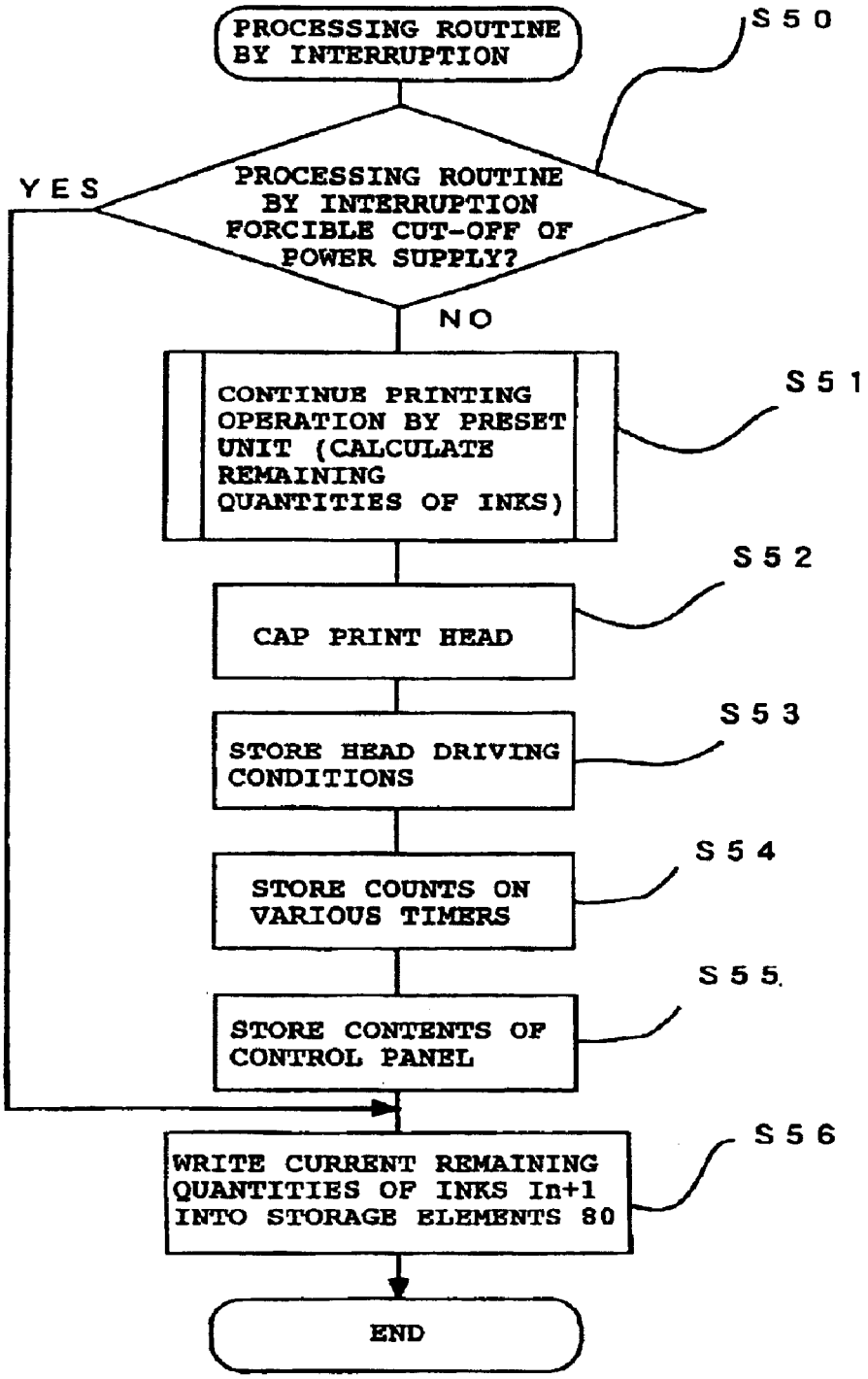
FIG. 13 is a flowchart showing a processing routine to store data into the storage elements 80, which is executed by interruption in response to a power down instruction.

The following describes a series of basic processings carried out by the ink jet printer 1 of the embodiment between a power-on time and a power-off time of the printer 1 and a difference between the allowable frequencies of writing into the storage element 80 and the EEPROM 90, with referring to the flowcharts of FIGS. 11 through 13. FIG. 11 is a flowchart showing a processing routine executed at a time of power supply to the printer 1. FIG. 12 is a flowchart showing a processing routine to calculate the remaining quantity of ink. FIG. 13 is a flowchart showing a processing routine executed at a power-off time of the printer 1.

The controller 46 executes the processing routine of FIG. 11 immediately after the start of power supply. When the power source 91 of the printer 1 is turned on, the controller 46 first determines whether or not the ink cartridge 107K or 107F has just been replaced at step S30. The decision of step S30 is carried out, for example, by referring to an ink cartridge replacement flag in the case where the EEPROM 90 has the ink cartridge replacement flag, or in another example, based on data relating to the time (hour and minute) of manufacture or the production serial number with regard to the ink cartridge 107K or 107F. In the case of power-on without replacement of the ink cartridges 107K and 107F, that is, in the case of a negative answer at step S30, the controller 46 reads the data from the respective storage elements 80 of the ink cartridges 107K and 107F at step S31.

When it is determined that the ink cartridge 107K or 107F has just been replaced, that is, in the case of an affirmative answer at step S30, on the other hand, the controller 46 increments the frequency of attachment by one and writes the incremented frequency of attachment into the storage element 80 of the ink cartridge 107K or 107F at step S32. The controller 46 then reads the data from the respective storage elements 80 of the ink cartridges 107K and 107F at step S31. The controller 46 subsequently writes the read-out data at preset addresses in the EEPROM 90 at step S33. At subsequent step S34, the controller 46 determines whether or not the ink cartridges 107K and 107F attached to the ink jet printer 1 are suitable for the ink jet printer 1, based on the data stored in the EEPROM 90. When suitable, that is, in the case of an affirmative answer at step S34, a printing operation is allowed at step S35. This completes the preparation for printing, and the program exits from the processing routine of FIG. 11. When not suitable, that is, in the case of a negative answer at step S34, on the contrary, the printing operation is not allowed, and information representing the prohibition of printing is displayed on either the switch panel 92 or the display MT at step S36.

In the case where the printing operation is allowed at step S35, the printer 1 carries out a predetermined printing process in response to a printing instruction output from the computer PC. At this moment, the controller 46 transfers print data to the print head 10 and calculates the remaining quantity of each ink. The processing routine executed in this state is described with reference to the flowchart of FIG. 12. When the program enters the printing process routine shown in FIG. 12, the controller 46 first reads data on the remaining quantity of each ink In from the EEPROM 90 incorporated in the print controller 40 at step S40. The data In is written on completion of the previous cycle of printing operation and represents the latest remaining quantity of each ink. The controller 46 then inputs print data from the computer PC at step S41. In the structure of this embodiment, the required image processing like color conversion and binarization is all carried out in the computer PC, and the printer 1 receives the binary data with regard to a predetermined number of raster lines, that is, the on-off data of ink dots. The controller 46 subsequently calculates an amount of ink consumption $\Delta I$ based on the input print data at step S42. The amount of ink consumption $\Delta I$ calculated here reflects not only the amount of ink consumption corresponding to the print data with regard to the predetermined number of raster lines input from the computer PC but also the amount of ink consumption by the head cleaning action including the flushing operation and the sucking operation. By way of example, the procedure of calculation multiplies the frequency of ejection of ink droplets by the weight of each ink droplet to calculate the quantity of ink ejection with regard to each ink, and adds the amount of ink consumption by the flushing operation and the sucking operation to the calculated quantity of ink ejection, so as to determine the amount of ink consumption $\Delta I$.

The controller 46 then sums up the amount of ink consumption $\Delta I$ thus calculated to determine a cumulative amount of ink consumption Ii at step S43. The amount of ink consumption corresponding to the input print data is successively calculated, but is not written into the EEPROM 90 on every time of calculation. In order to determine the total amount of ink consumption up to the moment, the procedure sums up the amount of ink consumption $\Delta I$ with regard to the input print data and thereby determines the cumulative amount of ink consumption Ii. The controller 46 subsequently converts the input print data to appropriate data suitable for the layout of the nozzle openings 23 on the print head 10 and the ejection timing and outputs the converted print data to the print head 10 at step S44.

When the processing of the input print data with regard to the predetermined number of raster lines is concluded, the controller determines whether or not the printing operation has been completed with regard to one page at step S45. In the case where the printing operation with regard to one page has not yet been completed, that is, in the case of a negative answer at step S45, the program returns to step S41 and repeats the processing of and after step S41 to input and process a next set of print data. In the case where the printing operation with regard to one page has been completed, that is, in the case of an affirmative answer at step S45, on the other hand, the program calculates the current remaining quantity of each ink In+1 at S46, and writes the current remaining quantity of ink In+1 thus calculated into the EEPROM 90 at step S47. The current remaining quantity of ink In+1 is obtained by subtracting the cumulative amount of ink consumption Ii determined at step S43 from the previous remaining quantity of ink In read at step S40. The updated remaining quantity of ink In+1 is rewritten into the EEPROM 90.

The procedure of this embodiment updates the data on the remaining quantity of ink by the unit of page. This is because the printing operation is generally carried out by the unit of page. One modified procedure carries out the writing operation of data on the remaining quantity of ink with regard to a predetermined number of pages or with regard to one raster line or a predetermined number of raster lines. Another modified procedure determines that the printing operation has been completed every time the print head 10 has moved forward and backward by a predetermined number of times, and writes the data on the remaining quantity of ink into the EEPROM 90.

The updated remaining quantity of each ink In+1 is written into only the EEPROM 90 incorporated in the print controller 40 of the printer 1 at the time of calculation. The same updated data on the remaining quantities of the respective inks are written into the storage elements 80 of the black ink cartridge 107K and the color ink cartridge 107F when the power down instruction NMI is output. The power down instruction NMI is output at the following three timings as described previously:

(1) at the timing when the power switch 92a on the switch panel 92 of the printer 1 is operated to turn the power source 91 off;

(2) at the timing when the cartridge switch 92b on the switch panel 92 is operated to give an instruction of replacing the ink cartridge; and (3) at the timing when the power supply is forcibly cut off by pulling the power plug out of the socket.

With referring to the flowchart of FIG. 13, the process of storing the data on the remaining quantities of inks into the respective storage elements 80 of the ink cartridges 107K and 107F is described. The processing routine shown in the flowchart of FIG. 13 is activated by interruption in response to the output of the power down instruction NMI as described previously. When the program enters the processing routine of FIG. 13, it is first determined whether or not the cause of the interruption is forcible cut-off of the power supply (the timing (3) discussed above) at step S50. In the case where the cause of the interruption is the forcible cut-off of the power supply, that is, in the case of an affirmative answer at step S50, the allowable time is only little and thus the program skips the processing of steps S51 through S55 and writes the updated data on the remaining quantities of inks In+1 into the respective storage elements 80 of the ink cartridges 107K and 107F at step S56. The updated remaining quantity of each ink In+1 written into the storage element 80 at step S56 has been calculated according to the processing routine of FIG. 12. The technique discussed above is applied to write the data on the remaining quantities of inks into the respective storage elements 80 of the ink cartridges 107K and 107F. The data on the remaining quantities of inks are written and stored into the second storage areas 660 and 760 of the respective storage elements 80. Here the remaining quantity of each ink is alternately written into the two memory divisions allocated to the ink. In accordance with one possible application, the execution of the storage into each memory division may be identified by means of a flag, which is located at the head of each memory division and inverted on completion of the writing operation into the memory division.

In the case where the cause of the interruption is not the forcible cut-off of the power supply, that is, in the case of a negative answer at step S50, on the other hand, it is determined that the interruption is caused by either the operation of the power switch 92a on the switch panel 92 in the printer 1 to turn the power source 91 off or the operation of the cartridge switch 92b on the switch panel 92 to give an instruction of replacement of the ink cartridge. The program accordingly continues the printing operation in progress by a preset unit, for example, up to the end of one raster line, and calculates the remaining quantities of inks at step S51. The calculation is performed according to the flowchart of FIG. 12. The controller 46 then drives the capping unit 108 to cap the print head 10 at step S52, and stores the driving conditions of the print head 10 into the EEPROM 90 at step S53. The driving conditions here include a voltage of the driving signal to compensate for the individual difference of the print head and a condition of collection to compensate for the difference between the respective colors. The controller 46 subsequently stores counts on a variety of timers into the EEPROM 90 at step S54, and stores the contents of a control panel, for example, an adjustment value to correct the misalignment of hitting positions in the case of bidirectional printing, into the EEPROM 90 at step S55. After the processing of step S55, the program carries out the processing of step S56 described above. Namely the controller 46 writes the updated data on the remaining quantities of inks In+1 into the second storage areas 660 and 760 of the respective storage elements 80 of the ink cartridges 107K and 107F at step S56. In the case where the power switch 92a on the switch panel 92 of the printer 1 is operated to activate this interruptive processing routine of FIG. 13, after the writing operation of the remaining quantities of inks at step S56, a signal is output to the power source 91 to cut off the power supply to the printer 1. In the case where the cartridge switch 92b on the switch panel 92 is operated to activate this interruptive processing routine of FIG. 13, after the processing of step S56, the carriage 101 is moved to a specific position for replacement. These processes are not specifically shown in the flowchart of FIG. 13.

Effects of First Embodiment

As described above, the printer 1 of the first embodiment calculates the remaining quantities of the respective inks in the black ink cartridge 107K and the color ink cartridge 107F, which are detachably attached to the carriage 101 of the printer main body 100, with the progress of the printing operation. The calculated data on the remaining quantities of inks are written into the EEPROM 90 every time the printing operation has been completed with regard to one page. The same data are written into the respective storage elements 80 of the ink cartridges 107K and 107F only at the timings when the power switch 92b on the switch panel 92 is operated to turn the power source 91 off, when the cartridge switch 92b on the switch panel 92 is operated to give an instruction of replacement of the ink cartridge, and when the power supply is forcibly cut off. The data on the remaining quantities of inks are updated at a higher frequency in the EEPROM 90, whereas the same data are updated at a lower frequency in the storage elements 80. This arrangement of the embodiment favorably restricts the writing frequency of the remaining quantity of each ink into the storage element 80 and thereby enables the storage unit having a relatively low allowable frequency of writing to be applied for the storage elements 80 of the expendable ink cartridges 107K and 107F. This advantageously reduces the manufacturing cost of the ink cartridge.

Although the frequency of rewriting data into the storage elements 80 is restricted, the latest data on the remaining quantities of inks are stored in the EEPROM 90 of the printer 1. The arrangement of the embodiment accordingly does not have any adverse effects on the monitoring process of the remaining quantities of inks in the printer 1. The monitoring process may blink an LED mounted on the switch panel 92 of the printer 1 when the remaining quantity of ink becomes equal to or less than a preset level. The monitoring process may alternatively inform the printer driver incorporated in the computer PC of the fact that the remaining quantity of ink reaches the preset level and give an alarm on the display MT connected to the computer PC. Since the latest data on the remaining quantities of inks are kept in the EEPROM 90 of the print controller 40, the printer 1 can refer to the latest data on the remaining quantities of inks according to the requirements and output an alarm representing the state of running out of ink at an adequate timing. These data may be utilized to display the current remaining quantities of inks visually, for example, in the form of a bar graph, according to a utility program.

In the first embodiment, the remaining quantities of inks are written into the respective storage elements 80 of the ink cartridges 107K and 107F every time the power down instruction NMI is generated. When there is no change in the remaining quantities of inks, for example, in the case where no printing operation has been carried out since the start of power supply, however, the remaining quantities of inks may not be written into the storage elements 80. Such a decision may depend upon a flag, which is set when there is any change in the remaining quantities of inks. In this structure, the value of the flag is read immediately after the output of the power down instruction NMI. In the embodiment discussed above, the data written into the storage elements regard the remaining quantities of inks. There are, however, other data that are written into the EEPROM 90 and the storage elements 80 at different frequencies. By way of example, such data may regard the cumulative time period of use of the ink cartridge or the state of application of the ink cartridge.

The timings of the writing operations into the EEPROM 90 and the storage elements 80 are not restricted to those described above. For example, while the writing operation into the EEPROM 90 is performed M times, the writing operation into the storage elements 80 is performed only once. When the cleaning switch 92c on the switch panel 92 is operated to activate the sucking operation, the remaining quantity of ink significantly decreases. The writing operation of data into the storage element 80 may accordingly be carried out on completion of the head cleaning by the sucking action. In accordance with another preferable application, the frequency of writing into the storage element 80 is written into a specific area of the storage element 80. With an increase in frequency of writing, the timing of the writing operation is reduced to decrease the frequency of writing. In accordance with still another preferable application, the writing operation of data into the storage elements 80 of the ink cartridges 107K and 107F is carried out when the user gives an explicit instruction. For example, data may be written into the storage elements 80 when the user activates the printer driver and presses a 'Write' button provided in the printer driver or when the user operates a switch for writing instruction provided on the switch panel 92. This arrangement restricts the frequency of writing into the storage elements 80. Another application monitors the frequencies of the writing operations into the EEPROM 90 and the storage elements 80 and neglects a writing instruction of the user in the case where the frequency of writing into the storage element 80 is undesirably high.

In another possible configuration, a buffer memory (RAM) is provided in either the print controller 40 or the storage elements 80. The controller 46 writes data into the EEPROM 90 and the buffer memory at identical timings and thereby at an identical frequency. The timing of writing data from the buffer memory to the storage elements 80 is restricted, for example, to the time of the cut-off of the power supply and the time of a replacement of the ink cartridge. This arrangement also desirably restricts the frequency of the writing operation into the memory cells 81, which have the restriction of the writing frequency. As described above, in the first embodiment, an inexpensive EEPROM, which carries out only the sequential access, is applied for the memory cells 81 of the storage elements 80 included in the black and color ink cartridges 107K and 107F. Such application desirably reduces the cost of the expendable ink cartridges 107K and 107F.

In the arrangement of the first embodiment, the second storage areas 660 and 760 in the storage elements 80, where rewritable data are stored, are located at addresses that are sequentially accessed prior to the first storage areas 650 and 750, where read only data are stored. Even in the structure that carries out the writing operation of data into the second storage areas 660 and 760 after the power-off operation of the power switch 92a on the switch panel 92, this arrangement ensues completion of the writing operation of data before the power plug is pulled out of the socket. The configuration of the first embodiment, which applies the inexpensive storage elements 80 enabling only the sequential access to decrease the cost of the ink cartridges 107K and 107F, thus advantageously reduces the possible failure in the process of rewriting the data.

In the first embodiment, data on the remaining quantities of inks are stored with regard to the respective inks in the ink cartridges 107K and 107F. This arrangement enables the user to be informed of the remaining quantity of each ink and to receive an alarm representing the out of Ink with regard to each ink.

Second Embodiment

Figure 14:
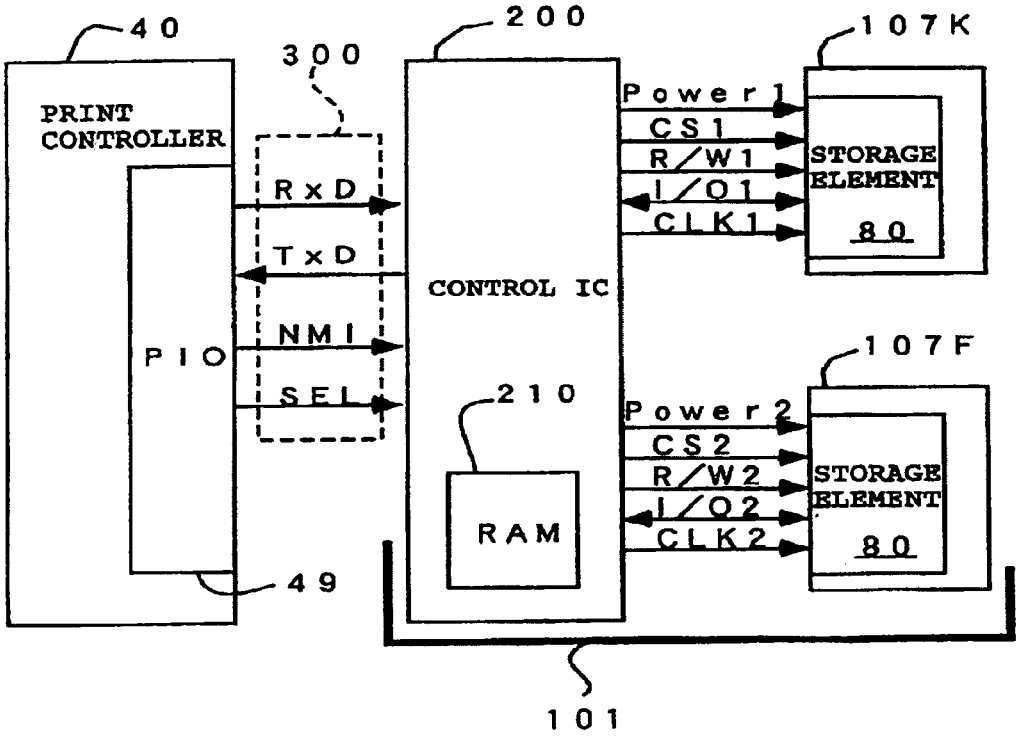
FIG. 14 is a block diagram showing a connection of a control IC 200 in a second embodiment according to the present invention.

The following describes a second embodiment according to the present invention. An ink jet printer and ink cartridges of the second embodiment have structures that are substantially similar to those of the ink jet printer 1 and the ink cartridges 107K and 107F in the first embodiment. The only difference from the first embodiment is that a control IC 200 is provided between the parallel input-output interface 49 in the print controller 40 of the printer 1 and the respective storage elements 80 of the black and color ink cartridges 107K and 107F. Referring to FIG. 14, the control IC 200 is disposed between the parallel input-output interface 49 and the respective storage elements 80 of the ink cartridges 107K and 107F and actually located on the carriage 101. A RAM 210, which is a DRAM, is incorporated in the control IC 200.

The control IC 200 is connected with the parallel input-output interface 49 via four signal lines and transmits data to and from the parallel input-output interface 49 by serial communication. The four signal lines include a signal line R×D, through which the control IC 200 receives data, a signal line T×D, through which the control IC 200 outputs data, a power down signal line NMI, through which the print controller 40 outputs a requirement of writing operation at the time of power failure to the control IC 200, and a selection signal line SEL that allows transmission of data through either the signal line R×D or the signal line T×D. These four signals are transmitted between the parallel input-output interface 49 and the control IC 200 via a flexible print cable (FPC) 300. The controller 46 transmits required data to and from the control IC 200 using these four signals. The speed of communication between the controller 46 and the control IC 200 is sufficiently higher than the speed of data transmission between the control IC 200 and the storage elements 80. As described in the first embodiment, the power down signal NMI is output when the power switch 92a on the switch panel 92 is operated, when the cartridge switch 92b on the switch panel 92 is operated, and when the power supply is forcibly cut off by pulling the power plug out of the socket.

The control IC 200 has a function of separately transmitting data to and from the two storage elements 80. In the arrangement of the second embodiment, one control IC 200 attains data transmission to and from the respective storage elements 80 of the black ink cartridge 107K and the color ink cartridge 107F. In the illustration of FIG. 14, in order to discriminate the signal lines to the respective storage elements 80, a suffix '1' is added to a power source line Power and respective signals CS, R/W, I/O, and CLK with regard to the black ink cartridge 107K and a suffix '2' is added with regard to the color ink cartridge 107F.

In the structure of the second embodiment, the controller 46 of the print controller 40 in the printer 1 carries out the processing routine shown in the flowchart of FIG. 12. In the second embodiment, however, after calculating the current remaining quantities of inks In+1 at step S46, the controller 46 writes the calculated current remaining quantities of inks In+1 not into the EEPROM 90 but into the RAM 210 incorporated in the control IC 200. The controller 46 makes the selection signal SEL active to select the control IC 200 and writes the current data In+1 on the remaining quantities of inks into the control IC 200 through the signal line R×D by non-synchronous serial communication.

In the case of a press of the power switch 92a, a press of the cartridge switch 92b, or the forcible cut-off of the power supply, the print controller 40 outputs the power down signal NMI both inside the print controller 40 and outside the print controller 40, that is, to the control IC 200. The control IC 200 receives the power down signal NMI and writes at least the data regarding the remaining quantities of the respective inks among the data stored in the internal RAM 210, into the respective storage elements 80 of the ink cartridges 107K and 107F. The control IC 200 carries out the writing operation into the storage elements 80 by the technique discussed in the first embodiment. As shown in FIGS. 7A and 7B, the technique first makes the chip select signal CS active, then makes the read/right signal R/W in the high active state to select the writing operation, and successively outputs the data DATA synchronously with the clock signal CLK.

In the second embodiment discussed above, the data on the remaining quantities of inks, which are to be written into the storage elements 80 of the ink cartridges 107K and 107F, are stored in the RAM 210 incorporated in the control IC 200 that directly controls the data transmission to and from the storage elements 80. The controller 46 writes the data regarding the remaining quantities of inks into the RAM 210 of the control IC 200 every time the data are updated, that is, every time the printing operation with regard to one page has been completed. Namely the latest data on the remaining quantities of the inks are kept in the RAM 210 of the control IC 200. When the power down signal NMI is output in response to the forcible cut-off of the power supply, the data stored in the RAM 210 are immediately written into the respective storage elements 80 of the ink cartridges 107K and 107F, irrespective of the operation of the print controller 40 and the controller 46 therein. This arrangement desirably simplifies the processing of the controller 46 at the time of forcible cut-off of the power supply and thereby significantly reduces the loading of the processing. In the second embodiment discussed above, the writing operation of data Into the storage elements 80 of the ink cartridges 107K and 107F is initiated by the output of the power down signal NMI. One possible modification transmits a standard command of the writing operation through the receiving signal line R×D, so as to cause the control IC 200 to initiate the writing operation of data.

In the arrangement of the second embodiment, the writing operation of the remaining quantities of inks into the RAM 210 of the control IC 200 is carried out at a higher frequency, whereas the writing operation into the memory cells 81 of the storage elements 80 is carried out at a lower frequency. This arrangement fulfills the contradictory requirements, that is, the storage of latest and accurate data and the restriction of the frequency of writing operation into the non-volatile memory cells 81. The RAM 210 used in the second embodiment is a DRAM, which erases the contents of storage when the power supply to the printer 1 is cut off. In the arrangement of the second embodiment, the control IC 200 accordingly reads the data on the remaining quantities of inks stored in the storage elements 80 and stores the data into the RAM 210 on a start of the power supply to the printer 1. The controller 46 reads the data from the RAM 210 at a first timing of calculation of the remaining quantities of inks (step S40 in the flowchart of FIG. 12) and uses the data for the subsequent calculation of the remaining quantities of inks.

Figure 15:
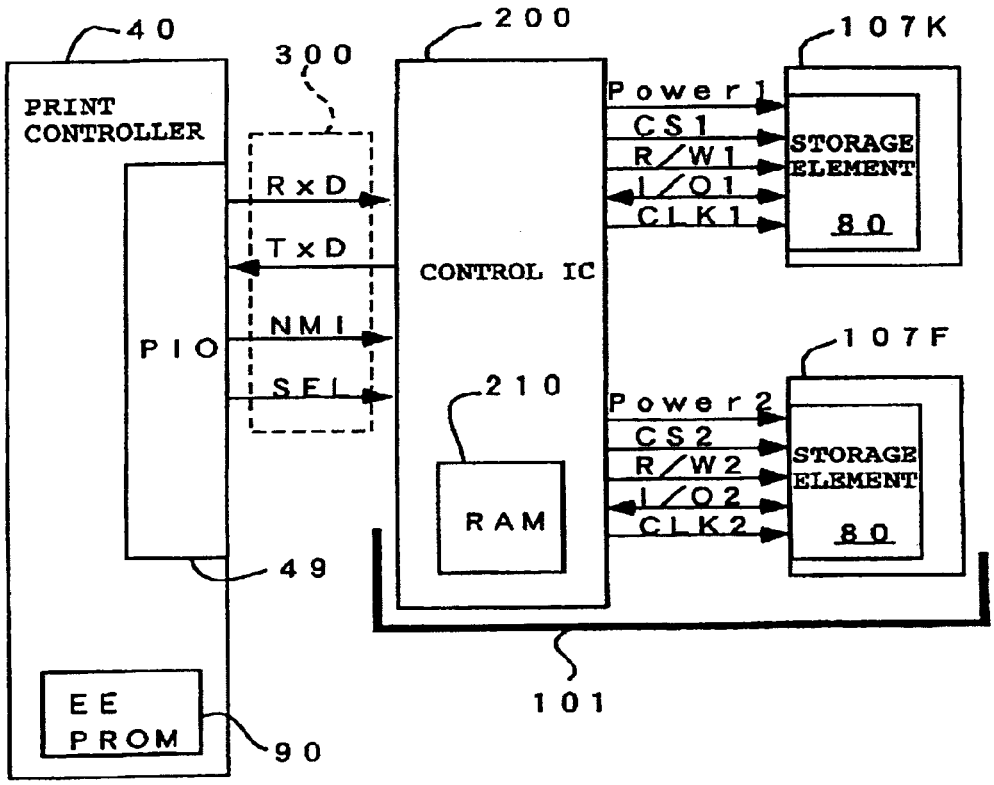
FIG. 15 is a block diagram showing a memory structure in one modification of the second embodiment.

One modification of the second embodiment shown in FIG. 15 writes the latest data on the remaining quantities of inks into the EEPROM 90 incorporated in the print controller 40 at a certain frequency, which is lower than the frequency of the writing operation into the RAM 210 incorporated in the control IC 200 but higher than the frequency of the writing operation into the memory cells 81 of the storage elements 80. In one example, the writing operation into the RAM 210 of the control IC 200 is carried out at the timings of calculation shown in the flowchart of FIG. 12. The data on the remaining quantities of inks are written into the EEPROM 90 at certain timings when the printer 1 has some marginal time in the course of the processing, for example, by a separate interruptive routine. The same data are transferred to the storage elements 80 at the timing of the power-off operation. This arrangement ensures the back-up of the data with the EEPROM 90 that has the restriction of the writing frequency, while enabling the latest data to be kept in the RAM 210 of the control IC 200. The latest data are written into the storage elements 80 of the ink cartridges 107K and 107F, for example, at the time of forcible cut-off of the power supply.

In accordance with another modification of the second embodiment, the calculated data on the remaining quantities of inks are written into a specific area in the RAM 44 every time the printing operation with regard to one page has been completed in the processing routine of FIG. 12. The data on the remaining quantities of inks are written into the RAM 210 incorporated in the control IC 200 by an interruptive routine, which is activated at a different timing from the timing of the writing operation into the RAM 44. In this arrangement, the latest data on the remaining quantities of inks are kept on the RAM 44. Another possible modification backs up the contents of storage in the RAM 210 of the control IC 200 by means of a battery or a mass storage capacitor. The RAM 210 may be replaced with an EEPROM. The contents of storage in the EEPROM 90 incorporated in the printer main body 100 may not be completely coincident with the contents of storage in the RAM 210 of the control IC 200. Other pieces of information required for the control procedure as well as the pieces of information relating to the ink cartridges 107K and 107F are written into the EEPROM 90, whereas only the information relating to the ink cartridges 107K and 107F are written into the RAM 210 of the control IC 200.

The present invention is not restricted to the above embodiments or their modifications, but there may be many other modifications, changes, and alterations without departing from the scope or spirit of the main characteristics of the present invention. For example, dielectric memories (FROM) may replace the memory cells 81 in the storage elements 80 and the EEPROM 90.

Figure 16:
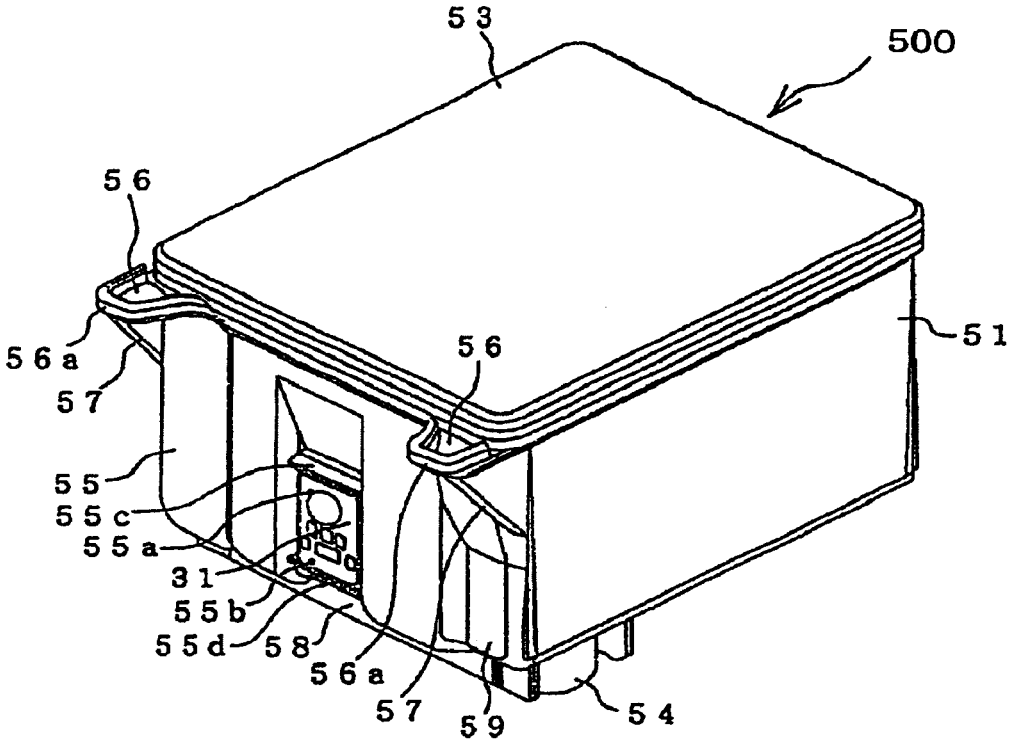
FIG. 16 is a perspective view illustrating the structure of another color ink cartridge as one modification of the present invention.

The information relating to the quantities of inks indicates the remaining quantities of inks in the above embodiments, but may indicate the amounts of ink consumption instead. The storage elements 80 may not be incorporated in the respective ink cartridges 107K and 107F, but may be exposed to the outside. FIG. 16 shows a color ink cartridge 500 having an exposed storage element. The ink cartridge 500 includes a vessel 51 substantially formed in the shape of a rectangular parallelepiped, a porous body (not shown) that is impregnated with ink and accommodated in the vessel 51, and a cover member 53 that covers the top opening of the vessel 51. The vessel 51 is parted into five ink chambers (like the ink chambers 107C, 107LC, 107M, 107LM, and 107Y in the ink cartridge 107F discussed in the above embodiments), which separately keep five different color inks. Ink supply inlets 54 for the respective color inks are formed at specific positions on the bottom face of the vessel 51. The ink supply inlets 54 at the specific positions face ink supply needles (not shown here) when the ink cartridge 500 is attached to a cartridge attachment unit of a printer main body (not shown here). A pair of extensions 56 are integrally formed with the upper end of an upright wall 55, which is located on the side of the ink supply inlets 54. The extensions 56 receive projections of a lever (not shown here) fixed to the printer main body. The extensions 56 are located on both side ends of the upright wall 55 and respectively have ribs 56a. A triangular rib 57 is also formed between the lower face of each extension 56 and the upright wall 55. The vessel 51 also has a check recess 59, which prevents the ink cartridge 500 from being attached to the unsuitable cartridge attachment unit mistakenly.

The upright wall 55 also has a recess 58 that is located on the substantial center of the width of the ink cartridge 500. A circuit board 31 is mounted on the recess 58. The circuit board 31 has a plurality of contacts, which are located to face contacts on the printer main body, and a storage element (not shown) mounted on the rear face thereof. The upright wall 55 is further provided with projections 55a and 55b and extensions 55c and 55d for positioning the circuit board 31.

The ink cartridge 500 of this structure also enables the data on the remaining quantities of inks to be stored into the storage element provided on the circuit board 31, as in the embodiments discussed above.

The above embodiments use the five color inks, magenta, cyan, yellow, light cyan, and light magenta, as the color inks kept in the color ink cartridge 107F. The principle of the present invention is also applicable to another ink cartridge, in which six or more different color inks are kept. The present invention is further applicable to the structure in which the ink cartridges are set to the printer main body 100, as well as to the structure in which the ink cartridges are mounted on the carriage 101.

The scope and spirit of the present invention are limited only by the terms of the appended claims.

What is claimed is:

1. A printer *having a printer main body*, to which a cartridge is detachably attached, said cartridge keeping ink therein and having a rewritable non-volatile memory, wherein the ink kept in said cartridge is transferred to a printing medium, so as to implement printing, said printer comprising:

a memory writing unit that writes plural pieces of information relating to said cartridge into said rewritable non-volatile memory of said cartridge[at a preset timing and thereby at a certain frequency];

a rewritable storage device incorporated in said printer main body of said printer; and an information writing unit that writes specific information into said rewritable storage device of said printer main body [at a specified frequency that is higher than the certain frequency, at which the plural pieces of information relating to said cartridge are written] *more frequently than the memory writing unit writes information* into said non-volatile memory of said cartridge, the specific information being identical with at least part of the plural pieces of information relating to said cartridge.

2. A printer in accordance with claim 1, wherein said information writing unit writes the specific information into said rewritable storage device of said printer main body at the preset timing as well as at another timing.

3. A printer in accordance with either one of claims 1 and 2, said printer further comprising:

a print head that is mounted on [a] *said* printer main body of said printer, wherein said cartridge is detachably attached to a carriage, on which said print head is mounted and which moves forward and backward relative to said printing medium, and said storage device of said printer main body is disposed on said carriage.

4. A printer in accordance with claim 1, wherein said memory writing unit writes the plural pieces of information into said rewritable non-volatile memory of said cartridge at a power-off time of said printer and/or at a time of replacement of said cartridge.

5. A printer in accordance with any one of claims 1 [through 3] *and 2*, wherein said information writing unit writes the specific information into said rewritable storage device on completion of printing with regard to one page.

6. A printer in accordance with any one of claims 1[through 5], *2 and 4*, wherein said information writing unit writes the specific information into said rewritable storage device on completion of printing with regard to at least one raster line.

7. A printer in accordance with any one of claims 1[through 6], *2 and 4*, said printer further comprising:

a print head that is mounted on [a] *said* printer main body of said printer; and a cleaning unit that is activated in response to a predetermined operation, so as to carry out a head cleaning process, which causes said print head to eject a predetermined quantity of ink, wherein said information writing unit writes the specific information into said rewritable storage device at a timing when said cleaning unit is activated.

8. A printer in accordance with claim 1, wherein said non-volatile memory transmits data by serial access, and said memory writing unit writes the plural pieces of information into said non-volatile memory of said cartridge in synchronism with a clock for specifying an address.

9. A printer in accordance with claim 1, wherein said rewritable storage device of said printer main body is a non-volatile memory that holds contents of storage even after a power-off operation of said printer.

10. A printer in accordance with claim 1, wherein a writing rate of said rewritable storage device of said printer main body is higher than a writing rate of said rewritable non-volatile memory of said cartridge.

11. A printer in accordance with claim 10, wherein said rewritable storage device of said printer main body is either a DRAM or an SRAM.

12. A printer in accordance with either one of claims 9 and 11, wherein said rewritable storage device of said printer main body is disposed in a control IC, which directly controls the writing operation of the plural pieces of information into said non-volatile memory of said cartridge.

13. A printer in accordance with claim 12, said printer further comprising:

a print head that is mounted on [a] *said* printer main body of said printer, wherein said cartridge is detachably attached to a carriage, on which said print head is mounted and which moves forward and backward relative to said printing medium, said control IC is disposed on said carriage, and said control IC on said carriage transfers data to be written into said non-volatile memory from said printer main body to said cartridge via a cable connecting with said carriage.

14. A printer in accordance with claim 1, wherein both a black ink cartridge that keeps black ink and a color ink cartridge that keeps a plurality of different color inks are detachably attached to said printer as said cartridge, and said memory writing unit writes the plural pieces of information into non-volatile memories, which are respectively provided in said black ink cartridge and said color ink cartridge.

15. A printer in accordance with claim 1, wherein said memory writing unit writes the plural pieces of information into said non-volatile memory of said cartridge, before said information writing unit writes the specific information into said rewritable storage device of said printer main body.

16. A printer in accordance with claim 1, wherein said memory writing unit writes the plural pieces of information into said non-volatile memory of said cartridge, after the writing operation of said information writing unit into said rewritable storage device of said printer main body is completed.

17. A printer in accordance with claim 1, said printer further comprising:

an identification unit that determines whether or not contents of storage in said non-volatile memory of said cartridge are coincident with contents of storage in said rewritable storage device of said printer main body at a time of power supply to said printer and/or at a time of initiating a replacement of said cartridge; and a reconciliation unit that reconciles the contents of storage in one of said non-volatile memory and said rewritable storage device with the contents of storage in the other of said non-volatile memory and said rewritable storage device, in the case where said identifications unit determines that the contents of storage in said non-volatile memory are not coincident with the contents of storage in said rewritable storage device.

18. A method of managing information in a printer, to which a cartridge is detachably attached, said cartridge keeping ink therein and having a rewritable nonvolatile memory, wherein the ink kept in said cartridge is transferred to a printing medium, so as to implement printing, said method comprising the steps of:

writing plural pieces of information relating to said cartridge into said rewritable non-volatile memory of said cartridge at a preset timing and thereby at a certain frequency; and writing specific information into a rewritable storage device incorporated in said printer main body of said printer at a specified frequency that is higher than the certain frequency, at which the plural pieces of information relating to said cartridge are written into said non-volatile memory of said cartridge, the specific information being identical with at least part of the plural pieces of information relating to said cartridge.

19. A cartridge keeping ink therein and having a rewritable non-volatile memory, said cartridge [being] *configured to be* detachably attached to a printer, wherein information relating to said cartridge is written into said non-volatile memory of said cartridge [at a certain frequency that is lower than a specified frequency, at which] *less frequently than* the information relating to said cartridge is written into a storage device incorporated in a printer main body of said printer,

*and wherein the information is written into said non-volatile memory in response to a power down instruction occurred in the printer main body.*

20. A cartridge in accordance with claim 19, wherein the information relating to said cartridge is written into said non-volatile memory of said cartridge at a power-off time of said printer and/or at a time of replacement of said cartridge.

21. A cartridge in accordance with claim 19, wherein said non-volatile memory transmits data by serial access, and the writing operation of the information relating to said cartridge into said non-volatile memory is carried out synchronously with a clock for specifying an address.

22. A cartridge in accordance with claim 19, wherein the information relating to said cartridge is written into said non-volatile memory of said cartridge, before the information is written into said storage device of said printer main body.

23. A cartridge in accordance with claim 19, wherein the information relating to said cartridge is written into said non-volatile memory of said cartridge, after the writing operation of the information into said storage device of said printer main body is completed.

24. A cartridge in accordance with claim 19, said cartridge comprising:

an ink reservoir, in which a plurality of different inks are kept, wherein plural pieces of information with regard to the plurality of different inks are written into said non-volatile memory of said cartridge.

25. A cartridge in accordance with claim 24, wherein said ink reservoir is parted into at least three ink chambers, in which at least three different inks are kept, wherein said non-volatile memory comprises a plurality of information storage areas, in which plural pieces of information regarding quantities of the at least three different inks are stored respectively and independently, and a storage capacity of at least one byte is allocated to each of the plurality of information storage areas.

26. A cartridge in accordance with claim 24, wherein said ink reservoir is parted into at least five ink chambers, in which at least five different inks are kept, wherein said non-volatile memory comprises a plurality of information storage areas, in which plural pieces of information regarding quantities of the at least five different inks are stored respectively and independently, and a storage capacity of at least one byte is allocated to each of the plurality of information storage areas.

27. A cartridge in accordance with claim 26, wherein the at least five different inks comprise three deep color inks and two light color inks, which correspond to two deep colors among the three deep color inks, the information storage areas for storing pieces of information regarding the three deep color inks being located in a first area that Is written first by said printer, and the information storage areas for storing pieces of information regarding the two light color inks being located in a second area that is written next by said printer.

28. A cartridge in accordance with claim 27, wherein the three deep color inks are cyan, magenta, and yellow, and the two light color inks are light cyan and light magenta.

29. A cartridge in accordance with claim 24, wherein said non-volatile memory has a specific writing area, in which the plural pieces of information are written, on one end of a memory space thereof.

30. A cartridge in accordance with claim 19, wherein said non-volatile memory is an EEPROM.

*31. A cartridge in accordance with claim 19, wherein the power down instruction occurs when*

*(1) a power switch of the printer is turned down;*

*(2) a cartridge switch is operated to give an instruction of replacing the ink cartridge; and*

*(3) a power supply to the printer main body is forcibly cut off by pulling a power plug.*

*32. A printer having a printer main body, to which a cartridge is detachably attached, said cartridge keeping ink therein and having a rewritable non-volatile memory, wherein the ink kept in said cartridge is transferred to a printing medium, so as to implement printing, said printer comprising:*

*memory writing means for writing information relating to said cartridge into said rewritable non-volatile memory of said cartridge;*

*means for storing data which can be rewritten, said means for storing data being incorporated in said printer main body of said printer; and*

*information writing means for writing specific information into said means for storing data more frequently than the memory writing means writes information into said non-volatile memory of said cartridge, the specific information being identical with at least part of the information relating to said cartridge.*

*33. A printer in accordance with claim 32, wherein said information writing means writes the specific information into said means for storing data of said printer main body at the preset timing as well as at another timing.*

*34. A printer in accordance with either one of claims 32 and 33, said printer further comprising:*

*printing means mounted on said printer main body of said printer for printing on the printing medium,*

*wherein said cartridge is detachably attached to a carriage, on which said printing means is mounted and which moves forward and backward relative to said printing medium, and*

*said means for storing data of said printer main body is disposed on said carriage.*

*35. A printer in accordance with claim 32, wherein said memory writing means writes the plural pieces of information into said rewritable non-volatile memory of said cartridge at a power-off time of said printer and/or at a time of replacement of said cartridge.*

*36. A printer in accordance with any one of claims 32 through 35, wherein said information writing means writes the specific information into said means for storing data of said printer main body on completion of printing with regard to one page.*

*37. A printer in accordance with any one of claims 32 through 36, wherein said information writing means writes the specific information into said means for storing data of said printer main body on completion of printing with regard to at least one raster line.*

*38. A printer in accordance with any one of claims 32 through 37, said printer further comprising:*

*printing means mounted on said printer main body of said printer for printing on the printing medium; and*

*cleaning means, activated in response to a predetermined operation, for cleaning said printing means,*

*wherein said information writing means writes the specific information into said means for storing data at a timing when said cleaning means is activated.*

*39. A printer in accordance with claim 32, wherein said non-volatile memory transmits data by serial access, and*

*said memory writing means writes the plural pieces of information into said non-volatile memory of said cartridge in synchronism with a clock for specifying an address.*

*40. A printer in accordance with claim 32, wherein said means for storing data of said printer main body is a non-volatile memory that holds contents of storage even after a power-off operation of said printer.*

*41. A printer in accordance with claim 32, wherein a writing rate of said means for storing data of said printer main body is higher than a writing rate of said rewritable non-volatile memory of said cartridge.*

*42. A printer in accordance with claim 41, wherein said means for storing data of said printer main body is either a DRAM or an SRAM.*

*43. A printer in accordance with either one of claims 40 and 42, wherein said means for storing data of said printer main body is disposed in a control IC, which directly controls the writing operation of the plural pieces of information into said non-volatile memory of said cartridge.*

*44. A printer in accordance with claim 43, said printer further comprising:*

*printing means mounted on said printer main body of said printer for printing on the printing medium,*

*wherein said cartridge is detachably attached to a carriage, on which said printing means is mounted and which moves forward and backward relative to said printing medium,*

*said control IC is disposed on said carriage, and*

*said control IC on said carriage transfers data to be written into said non-volatile memory from said printer main body to said cartridge via a cable connecting with said carriage.*

*45. A printer in accordance with claim 32, wherein*

*both a black ink cartridge that keeps black ink and a color ink cartridge that keeps a plurality of different color inks are detachably attached to said printer as said cartridge, and*

*said memory writing means writes the plural pieces of information into non-volatile memories, which are respectively provided in said black ink cartridge and said color ink cartridge.*

*46. A printer in accordance with claim 32, wherein said memory writing means writes the plural pieces of information into said non-volatile memory of said cartridge, before said information writing means writes the specific information into said means for storing data of said printer main body.*

*47. A printer in accordance with claim 32, wherein said memory writing means writes the plural pieces of information into said non-volatile memory of said cartridge, after the writing operation of said information writing means into said means for storing data of said printer main body is completed.*

*48. A printer in accordance with claim 32, said printer further comprising:*

*identification means for determining whether or not contents of storage in said non-volatile memory of said cartridge are coincident with contents of storage in said means for storing data of said printer main body at a time of power supply to said printer and/or at a time of initiating a replacement of said cartridge; and*

*reconciliation means for reconciling the contents of storage in one of said non-volatile memory and said means for storing data of said printer main body with the contents of storage in the other of said non-volatile memory and said means for storing data of said printer main body, in the case where said identification means determines that the contents of storage in said non-volatile memory are not coincident with the contents of storage in said means for storing data of said printer main body.*

*49. A cartridge keeping ink therein and having a rewritable non-volatile memory, said cartridge for detachably attaching to a printer,*

*wherein information relating to said cartridge is written by a means for writing information into said non-volatile memory of said cartridge less frequently than the information relating to said cartridge is written into a storage device incorporated in a printer main body of said printer, and*

*wherein the means for writing writes the information into said non-volatile memory in response to a power down instruction occurred in the printer main body.*

*50. A cartridge in accordance with claim 49, wherein the means for writing writes the information relating to said cartridge into said non-volatile memory of said cartridge at a power-off time of said printer and/or at a time of replacement of said cartridge.*

*51. A cartridge in accordance with claim 49, wherein said non-volatile memory transmits data by serial access, and the writing operation of the information relating to said cartridge into said non-volatile memory is carried out by the means for writing synchronously with a clock for specifying an address.*

*52. A cartridge in accordance with claim 49, wherein the means for writing writes the information relating to said cartridge into said non-volatile memory of said cartridge, before the information is written into said storage device of said printer main body.*

*53. A cartridge in accordance with claim 49, wherein the means for writing writes the information relating to said cartridge is written into said non-volatile memory of said cartridge, after the writing operation of the information into said storage device of said printer main body is completed.*

*54. A cartridge in accordance with claim 49, said cartridge comprising:*

*ink storing means for storing a plurality of different inks,*

*wherein plural pieces of information with regard to the plurality of different inks are written by said means for writing into said non-volatile memory of said cartridge.*

*55. A cartridge in accordance with claim 54, wherein said ink storing means is parted into at least three ink chambers, in which at least three different inks are kept,*

*wherein said non-volatile memory comprises a plurality of information storage areas, in which plural pieces of information regarding quantities of the at least three different inks are stored respectively and independently, and*

*a storage capacity of at least one byte is allocated to each of the plurality of information storage areas.*

*56. A cartridge in accordance with claim 54, wherein said ink storing means is parted into at least five ink chambers, in which at least five different inks are kept,*

*wherein said non-volatile memory comprises a plurality of information storage areas, in which plural pieces of information regarding quantities of the at least five different inks are stored respectively and independently, and*

*a storage capacity of at least one byte is allocated to each of the plurality of information storage areas.*

*57. A cartridge in accordance with claim 56, wherein the at least five different inks comprise three deep color inks and two light color inks, which correspond to two deep colors among the three deep color inks,*

*the information storage areas for storing pieces of information regarding the three deep color inks being located in a first area that is written first by said printer, and the information storage areas for storing pieces of information regarding the two light color inks being located in a second area that is written next by said printer.*

*58. A cartridge in accordance with claim 57, wherein the three deep color inks are cyan, magenta, and yellow, and the two light color inks are light cyan and light magenta.*

*59. A cartridge in accordance with claim 56, wherein said non-volatile memory has a specific writing area, in which the plural pieces of information are written, on one end of a memory space thereof.*

*60. A cartridge in accordance with claim 49, wherein said non-volatile memory is an EEPROM.*

*61. A cartridge in accordance with claim 49, wherein the power down instruction occurs when*

*(1) a power switch of the printer is turned down;*

*(2) a cartridge switch is operated to give an instruction of replacing the ink cartridge; and*

*(3) a power supply to the printer main body is forcibly cut off by pulling a power plug.*

* * * * *